US012812725B2

(12) United States Patent
Yang et al.

(10) Patent No.: US 12,812,725 B2
(45) Date of Patent: Nov. 24, 2026

(54) COORDINATING DISCONTINUOUS RECEPTION (DRX) TIMERS BETWEEN A USER EQUIPMENT (UE) AND A NETWORK ENTITY

(71) Applicant: QUALCOMM Incorporated, San Diego, CA (US)

(72) Inventors: Ming Yang, San Diego, CA (US); Kausik Ray Chaudhuri, San Diego, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 336 days.

(21) Appl. No.: 18/405,664

(22) Filed: Jan. 5, 2024

(65) Prior Publication Data

US 2025/0227806 A1 Jul. 10, 2025

(51) Int. Cl.

| | |
|---|---|
| ***H04W 76/28*** | (2018.01) |
| ***H04W 72/231*** | (2023.01) |
| ***H04W 76/38*** | (2018.01) |

(52) U.S. Cl.

CPC ......... *H04W 76/28* (2018.02); *H04W 72/231* (2023.01); *H04W 76/38* (2018.02)

(58) Field of Classification Search

CPC ... H04W 72/231; H04W 76/28; H04W 76/38; H04W 76/27

See application file for complete search history.

(56) References Cited

U.S. PATENT DOCUMENTS

| | | | | |
|---|---|---|---|---|
| 11,832,334 | B2 * | 11/2023 | Nam | H04W 52/028 |
| 2022/0007456 | A1 * | 1/2022 | Bao | H04W 76/27 |

(Continued)

FOREIGN PATENT DOCUMENTS

| | | | | |
|---|---|---|---|---|
| CN | 109151909 A | * | 1/2019 | H04W 28/18 |
| CN | 109479309 A | * | 3/2019 | H04W 36/0079 |

(Continued)

OTHER PUBLICATIONS

International Search Report and Written Opinion—PCT/US2024/057165—ISA/EPO—Feb. 28, 2025.

(Continued)

*Primary Examiner* — Phong La

(74) *Attorney, Agent, or Firm* — Holland & Hart LLP / Qualcomm

(57) ABSTRACT

Methods, systems, and devices for wireless communications are described. The techniques described herein relate to coordinating discontinuous reception (DRX) timers between a user equipment (UE) and a network entity. A UE receives a first downlink message that updates one or more timers associated with triggering a connected mode discontinuous reception (C-DRX) at the UE. The UE transmits a first uplink message prior to an expiration of the one or more timers associated with triggering the C-DRX. The first uplink message indicates whether the UE expects to restart the one or more timers or to enter the C-DRX following transmission of the first uplink message. The UE selects to enter the C-DRX or remain in an awake state following transmission of the first uplink message based on a status of the one or more timers associated with triggering the C-DRX at the UE and the indication of the first uplink message.

20 Claims, 15 Drawing Sheets

(56) References Cited

U.S. PATENT DOCUMENTS

| | | | | |
|---|---|---|---|---|
| 2022/0046682 | A1* | 2/2022 | Zhang | H04W 72/1268 |
| 2024/0206006 | A1* | 6/2024 | Elshafie | H04W 52/0229 |
| 2024/0224183 | A1* | 7/2024 | Zorgui | H04W 52/0232 |
| 2024/0334537 | A1* | 10/2024 | Ly | H04W 76/28 |
| 2025/0150874 | A1* | 5/2025 | Kim | H04L 5/001 |

FOREIGN PATENT DOCUMENTS

| | | | | | |
|---|---|---|---|---|---|
| CN | 113518452 | A | * | 10/2021 | H04W 76/28 |
| CN | 111556590 | B | * | 7/2022 | H04W 56/00 |
| CN | 111955049 | B | * | 12/2023 | H04W 76/14 |
| WO | WO-2022147658 | A1 | * | 7/2022 | H04W 76/28 |
| WO | WO-2024138057 | A2 | * | 6/2024 | H04W 72/0446 |

OTHER PUBLICATIONS

Neul Ltd: "Optimisations for S1-Based Architecture", 3GPP TSG GERAN#65, GP-150053, 3rd Generation Partnership Project, Mobile Competence Centre, 650, Route Des Lucioles, F-06921, Sophia-Antipolis Cedex, France, vol. TSG GERAN, No. Shanghai, P. R. China, Mar. 10, 2015-Mar. 12, 2015, Mar. 3, 2015, 6 Pages, XP051626720, p. 2.

Rhode & Schwarz: "Power Saving Methods for LTE-M and NB-IoT Devices White Paper Power-saving-methods-for-LTE-M-and-NB-IoT-devices_wp_en_3609-3820", Jul. 10, 2019, pp. 1-28, XP055855796, p. 10-14, section 2.2.

* cited by examiner

COORDINATING DISCONTINUOUS RECEPTION (DRX) TIMERS BETWEEN A USER EQUIPMENT (UE) AND A NETWORK ENTITY

TECHNICAL FIELD

The following relates to wireless communications, including coordinating discontinuous reception (DRX) timers between a UE and a network entity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communication systems, a UE may operate in an inactive or sleep mode as part of a connected discontinuous reception (C-DRX) cycle, during which the UE does not monitor for downlink signals from a network entity. During an active or awake mode of the C-DRX, the UE may monitor for the downlink signals from the network entity. The network entity may configure the UE with one or more timers that trigger the UE to enter the sleep mode of C-DRX upon expiration of the one or more timers. In some examples, the network entity may transmit downlink signals while the UE is still in the sleep mode based on the one or more timers.

SUMMARY

The described techniques relate to improved methods, systems, devices, and apparatuses that support coordinating discontinuous reception (DRX) timers between a user equipment (UE) and a network entity. Prior to expiration of one or more timers (e.g., while in the awake mode of a connected mode discontinuous reception (C-DRX) cycle), a UE may transmit a first uplink signal indicating whether the UE expects to restart the one or more timers (e.g., to stay in the awake mode) or to enter the C-DRX (e.g., sleep mode). In some examples, the UE may transmit, prior to transmitting the first uplink message, a second uplink message indicating a capability to transmit the first uplink message.

Transmitting the first uplink signal, which indicates whether the UE expects to restart the one or more timers or to enter the C-DRX, may facilitate coordination of downlink signal transmissions from the network entity to the UE when the UE is in the awake mode. The coordinated transmissions between the network entity and the UE may reduce latency otherwise associated with retransmissions of downlink signals from the network entity when the UE is not monitoring for the initial transmission of downlink signals while in the sleep mode. The coordinated transmissions between the network entity and the UE may also reduce latency otherwise associated with the network entity receiving uplink signals when the network entity is in the sleep mode. The coordinated transmissions may also reduce power consumption at the UE and/or the network entity since the receiving UE and/or the network entity may not monitor for signals when the transmitting UE and/or network entity is in a sleep mode.

A method for wireless communications by a UE is described. The method may include receiving a first downlink message that updates one or more timers associated with triggering a C-DRX at the UE, transmitting a first uplink message prior to an expiration of the one or more timers associated with triggering the C-DRX, the first uplink message including an indication of whether the UE expects to restart the one or more timers or to enter the C-DRX following transmission of the first uplink message, and selectively entering the C-DRX or remaining in an awake state following transmission of the first uplink message based on a status of the one or more timers associated with triggering the C-DRX at the UE and the indication of the first uplink message.

A UE for wireless communications is described. The UE may include one or more memories storing processor executable code, and one or more processors coupled with (e.g., operatively, communicatively, functionally, electronically, or electrically) the one or more memories. The one or more processors may individually or collectively operable to execute the code (e.g., directly, indirectly, after pre-processing, without pre-processing) to cause the UE to receive a first downlink message that updates one or more timers associated with triggering a C-DRX at the UE, transmit a first uplink message prior to an expiration of the one or more timers associated with triggering the C-DRX, the first uplink message including an indication of whether the UE expects to restart the one or more timers or to enter the C-DRX following transmission of the first uplink message, and selectively enter the C-DRX or remaining in an awake state following transmission of the first uplink message based on a status of the one or more timers associated with triggering the C-DRX at the UE and the indication of the first uplink message.

Another UE for wireless communications is described. The UE may include means for receiving a first downlink message that updates one or more timers associated with triggering a C-DRX at the UE, means for transmitting a first uplink message prior to an expiration of the one or more timers associated with triggering the C-DRX, the first uplink message including an indication of whether the UE expects to restart the one or more timers or to enter the C-DRX following transmission of the first uplink message, and means for selectively entering the C-DRX or remaining in an awake state following transmission of the first uplink message based on a status of the one or more timers associated with triggering the C-DRX at the UE and the indication of the first uplink message.

A non-transitory computer-readable medium storing code for wireless communications is described. The code may include instructions executable by one or more processors (e.g., directly, indirectly, after pre-processing, without pre-processing) to receive a first downlink message that updates one or more timers associated with triggering a C-DRX at the UE, transmit a first uplink message prior to an expiration of the one or more timers associated with triggering the C-DRX, the first uplink message including an indication of whether the UE expects to restart the one or more timers or to enter the C-DRX following transmission of the first uplink message, and selectively enter the C-DRX or remaining in an awake state following transmission of the first uplink message based on a status of the one or more timers associated with triggering the C-DRX at the UE and the indication of the first uplink message.

Some examples of the method, UEs, and non-transitory computer-readable medium described herein may further include operations, features, means, or instructions for transmitting, prior to transmitting the first uplink message, a second uplink message indicating a capability of the UE to transmit the first uplink message including the indication of whether the UE expects to restart the one or more timers.

Some examples of the method, UEs, and non-transitory computer-readable medium described herein may further include operations, features, means, or instructions for receiving a second downlink message indicating a configuration for the UE to transmit the first uplink message including the indication of whether the UE expects to restart the one or more timers based on the capability of the UE.

Some examples of the method, UEs, and non-transitory computer-readable medium described herein may further include operations, features, means, or instructions for receiving a second downlink message enabling the UE to transmit the first uplink message including the indication of whether the UE expects to restart the one or more timers.

Some examples of the method, UEs, and non-transitory computer-readable medium described herein may further include operations, features, means, or instructions for receiving, prior to the expiration of the one or more timers associated with triggering the C-DRX, a third downlink message including an indication of whether a network entity expects to start a discontinuous reception downlink retransmission timer following transmission of the third downlink message.

In some examples of the method, UEs, and non-transitory computer-readable medium described herein, the third downlink message includes a physical downlink shared channel (PDSCH) transmission including a medium access control (MAC) control element (MAC-CE), the media access control (MAC)-CE including the indication of whether the network entity expects to start the discontinuous reception downlink retransmission timer following transmission of the third downlink message.

In some examples of the method, UEs, and non-transitory computer-readable medium described herein, a power level associated with the UE, an expectation of one or more downlink messages from a network entity, or an expectation of one or more uplink message by the UE.

In some examples of the method, UEs, and non-transitory computer-readable medium described herein, the first uplink message may be a last uplink transmission by the UE prior to the expiration of the one or more timers.

A method for wireless communications by a network entity is described. The method may include outputting a first downlink message that updates one or more timers associated with triggering a C-DRX for uplink messages from a UE and obtaining a first uplink message prior to an expiration of the one or more timers associated with triggering the C-DRX, the first uplink message including an indication of whether the UE expects to restart the one or more timers or to enter the C-DRX following reception of the first downlink message at the UE.

A network entity for wireless communications is described. The network entity may include one or more memories storing processor executable code, and one or more processors coupled with (e.g., operatively, communicatively, functionally, electronically, or electrically) the one or more memories. The one or more processors may individually or collectively operable to execute the code (e.g., directly, indirectly, after pre-processing, without pre-processing) to cause the network entity to output a first downlink message that updates one or more timers associated with triggering a C-DRX for uplink messages from a UE and obtain a first uplink message prior to an expiration of the one or more timers associated with triggering the C-DRX, the first uplink message including an indication of whether the UE expects to restart the one or more timers or to enter the C-DRX following reception of the first downlink message at the UE.

Another network entity for wireless communications is described. The network entity may include means for outputting a first downlink message that updates one or more timers associated with triggering a C-DRX for uplink messages from a UE and means for obtaining a first uplink message prior to an expiration of the one or more timers associated with triggering the C-DRX, the first uplink message including an indication of whether the UE expects to restart the one or more timers or to enter the C-DRX following reception of the first downlink message at the UE.

A non-transitory computer-readable medium storing code for wireless communications is described. The code may include instructions executable by one or more processors (e.g., directly, indirectly, after pre-processing, without pre-processing) to output a first downlink message that updates one or more timers associated with triggering a C-DRX for uplink messages from a UE and obtain a first uplink message prior to an expiration of the one or more timers associated with triggering the C-DRX, the first uplink message including an indication of whether the UE expects to restart the one or more timers or to enter the C-DRX following reception of the first downlink message at the UE.

Some examples of the method, network entities, and non-transitory computer-readable medium described herein may further include operations, features, means, or instructions for outputting a second downlink message based on the indication of the UE expecting to restart the one or more timers.

Some examples of the method, network entities, and non-transitory computer-readable medium described herein may further include operations, features, means, or instructions for obtaining, prior to receiving the first uplink message, a second uplink message indicating a capability of the UE to transmit the first uplink message including the indication of whether the UE expects to restart the one or more timers.

Some examples of the method, network entities, and non-transitory computer-readable medium described herein may further include operations, features, means, or instructions for outputting a second downlink message indicating a configuration for the UE to transmit the first uplink message including the indication of whether the UE expects restart the one or more timers based on the capability of the UE.

Some examples of the method, network entities, and non-transitory computer-readable medium described herein may further include operations, features, means, or instructions for outputting a second downlink message enabling the UE to transmit the first uplink message including the indication of whether the UE expects to restart the one or more timers.

Some examples of the method, network entities, and non-transitory computer-readable medium described herein may further include operations, features, means, or instructions for outputting, prior to the expiration of the one or more timers associated with triggering the C-DRX, a third downlink message including an indication of whether the network entity expects to start a discontinuous reception downlink retransmission timer following transmission of the third downlink message.

In some examples of the method, network entities, and non-transitory computer-readable medium described herein, the third downlink message includes an PDSCH transmission including a MAC-CE, the MAC-CE including the indication of whether the network entity expects to start the discontinuous reception downlink retransmission timer following transmission of the third downlink message.

In some examples of the method, network entities, and non-transitory computer-readable medium described herein, a power level associated with the UE, an expectation of one or more downlink messages from a network entity, or an expectation of one or more uplink message by the UE.

In some examples of the method, network entities, and non-transitory computer-readable medium described herein, the first uplink message may be a last uplink transmission by the UE prior to the expiration of the one or more timers.

DETAILED DESCRIPTION

In some wireless communication systems, a user equipment (UE) may operate in an inactive or sleep mode as part of a connected discontinuous reception (C-DRX) cycle, during which the UE does not monitor for downlink signals from a network entity. During an active or awake mode of the C-DRX, the UE may monitor for the downlink signals from the network entity. The network entity may configure the UE with one or more timers that trigger the UE to enter the sleep mode of C-DRX upon expiration of the one or more timers. In some examples, the network entity may transmit downlink signals while the UE is still in the sleep mode based on the one or more timers, causing the UE to not receive the downlink signals from the network entity.

Prior to expiration of the one or more timers, the UE may transmit a first uplink signal in a last transmission prior to expiration of the one or more timers, that cause the UE to enter the sleep mode. The first uplink signal may indicate whether the UE expects to restart the one or more timers (e.g., to stay in the awake mode) or to enter the C-DRX (e.g., sleep mode). In some examples, the UE may transmit, prior to transmitting the first uplink message, a second uplink message indicating a capability to transmit the first uplink message for coordinated transmissions.

Transmitting the first uplink signal, which indicates whether the UE expects to restart the one or more timers or to enter the C-DRX, may facilitate coordination of downlink signal transmissions from the network entity to the UE when the UE is in the awake mode. The coordinated transmissions between the network entity and the UE may reduce latency otherwise associated with retransmissions of downlink signals from the network entity when the UE is not monitoring for the initial transmission of downlink signals while in the sleep mode. The coordinated transmissions between the network entity and the UE may also reduce latency otherwise associated with the network entity receiving uplink signals when the network entity is in the sleep mode. Additionally, the coordinated transmissions may reduce power consumption at the UE and/or the network entity since the UE and/or the network entity may not monitor for signals when the transmitting device is in a sleep mode. Aspects of the disclosure are initially described in the context of wireless communications systems. Aspects of the disclosure are further illustrated by and described with reference to apparatus diagrams, system diagrams, and flowcharts that relate to coordinated transmissions.

Figure 1:
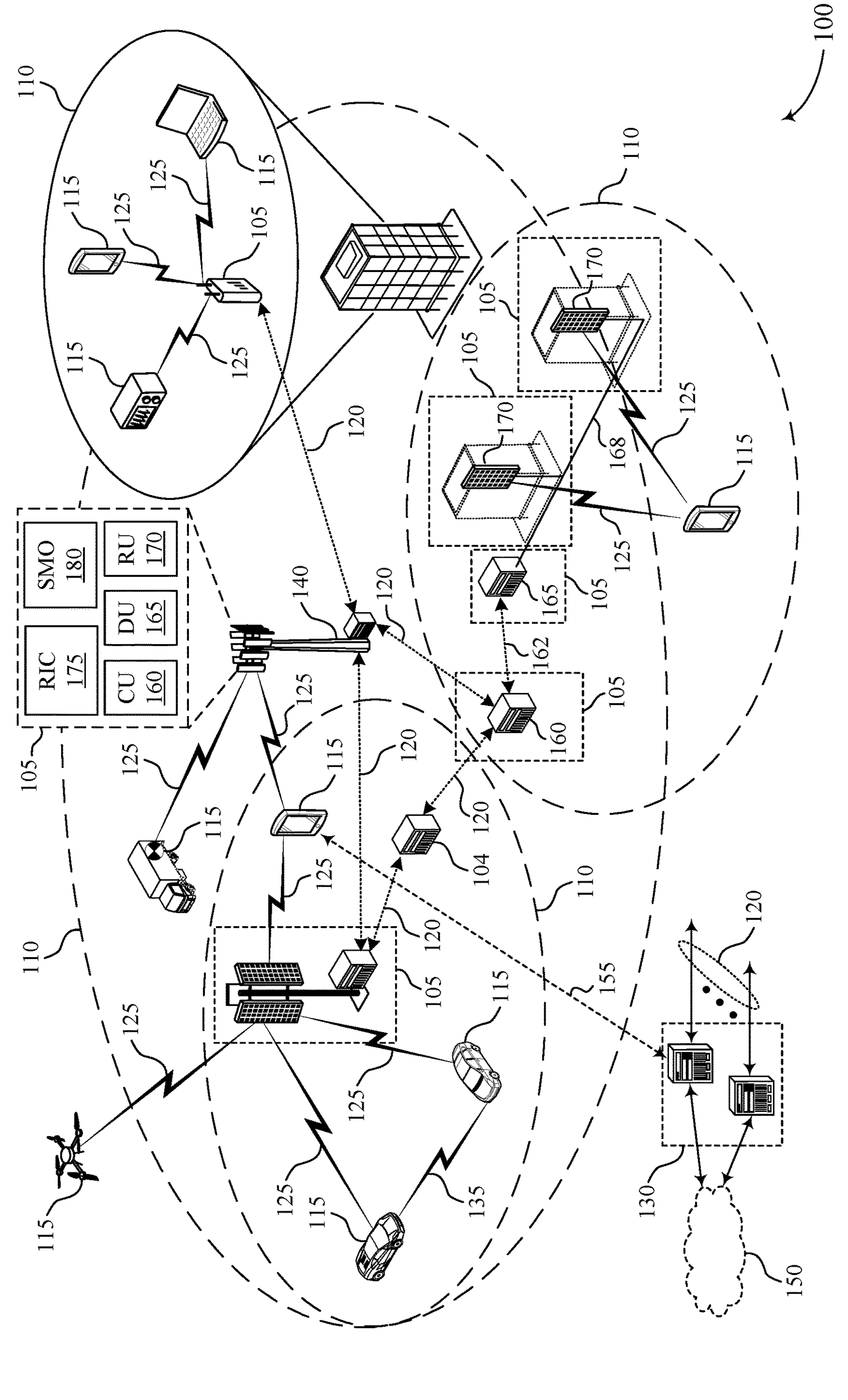
FIG. 1 shows an example of a wireless communications system that supports coordinating DRX timers between a UE and a network entity in accordance with one or more aspects of the present disclosure.

FIG. 1 shows an example of a wireless communications system 100 that supports coordinating DRX timers between a UE and a network entity in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more Dus 165 or RUs 170, and the one or more Dus 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support coordinating DRX timers between a UE and a network entity as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1: M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some example, the UE 115 may operate in an inactive or sleep mode as part of a C-DRX cycle, during which the UE 115 does not monitor for downlink signals from the network entity 105. During an active or awake mode of the C-DRX, the UE 115 may monitor for the downlink signals from the network entity 105. The network entity 105 may configure the UE 115 with one or more timers that trigger the UE 115 to enter the sleep mode of C-DRX upon expiration of the one or more timers. In some examples, the network entity 105 may transmit downlink signals while the UE 115 is still in the sleep mode based on the one or more timers, causing the UE 115 to not receive the downlink signals from the network entity 105.

Prior to expiration of one or more timers (e.g., while in the awake mode of a C-DRX cycle), the UE 115 may transmit a first uplink signal indicating whether the UE 115 expects to restart the one or more timers (e.g., to stay in the awake mode) or to enter the C-DRX (e.g., sleep mode). The first uplink signal may be included in a last uplink data transmission (e.g., a last PUSCH transmission) by the UE 115 immediately prior to an expected or scheduled expiration of the one or more timers. In some examples, the UE 115 may transmit, prior to transmitting the first uplink message, a second uplink message indicating a capability to transmit the first uplink message.

Transmitting the first uplink signal, which indicates whether the UE 115 expects to restart the one or more timers or to enter the C-DRX, may facilitate coordination of downlink signal transmissions from the network entity to the UE 115 when the UE 115 is in the awake mode. The coordinated transmissions between the network entity 105 and the UE 115 may reduce latency otherwise associated with retransmissions of downlink signals from the network entity 105 when the UE 115 is not monitoring for the initial transmission of downlink signals while in the sleep mode. The coordinated transmissions between the network entity 105 and the UE 115 may also reduce latency otherwise associated with the network entity 105 receiving uplink signals when the network entity 105 is in the sleep mode. The coordinated transmissions may also reduce power consumption at the UE 115 and/or the network entity 105 since the UE 115 and/or the network entity 105 may not monitor for signals when the transmitting device is in a sleep mode.

Figure 2:
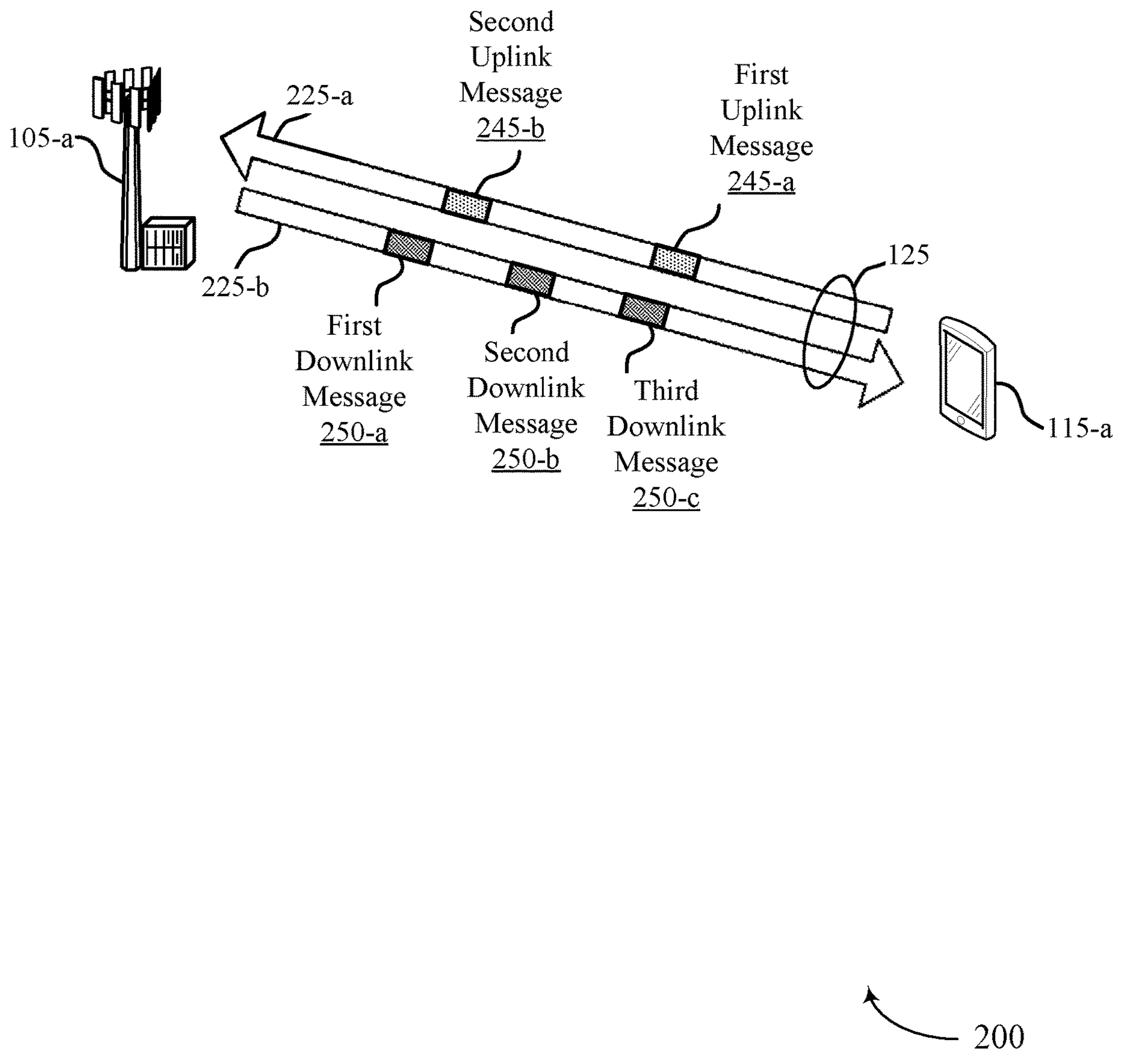
FIG. 2 shows an example of a wireless communications system that supports coordinating DRX timers between a UE and a network entity in accordance with one or more aspects of the present disclosure.

FIG. 2 shows an example of a wireless communications system 200 that supports coordinating DRX timers between a UE and a network entity in accordance with one or more aspects of the present disclosure. The wireless communications system 200 may implement aspects of or may be implemented by aspects of the wireless communications system 100. For example, the wireless communications system 200 includes a UE 115-*a* and a network entity 105-*a*, which may be examples of a UE 115 and a network entity 105 described with respect to FIG. 1.

In some examples, the UE 115-*a* and the network entity 105-*a* may communicate wireless signals without coordination on the last transmission from the UE 115-*a* to the network entity 105-*a* or from the network entity 105-*a* to the UE 115-*a*. For example, lack of coordination (e.g., signaling prior to expiration of the one or more timers indicating whether a device is entering the sleep mode upon expiration of the one or more timers or remaining in the awake mode by extending one or more timers) between to the UE 115-*a* and the network entity 105-*a*, may result in a mismatch between transmission of downlink signals from the network entity 105-*a*, uplink signals from the UE 115-*a*, and reception of the signals at the UE 115-*a* or the network entity 105, respectively. The mismatch may result in increased latency for receiving downlink signals at the UE 115-*a* or uplink signals at the network entity 105-*a*. In some examples, such as in a voice over inter protocol system, the mismatch between signal transmission and reception may result in data package loss, real-time transport protocol loss, voice quality below a threshold quality, and/or reduced user experience.

In some examples, the network entity 105-*a* may not have knowledge of the one or more timers associated with the UE 115-*a* entering C-DRX or the network entity 105-*a* may assume that one or more of the timers has not yet expired, such that the UE 115-*a* is still in the awake mode, while the one or more timers have expired and the UE 115-*a* is actually in the sleep mode (e.g., UE 115-*a* entered C-DRX). In some examples, the one or more timers may include at least an onDuration timer, an Inactivity timer, a HARQ RTT-DL timer, a DRX-RetransmissionTimerDL timer, a HARQ RTT-UL, a DRX-RetransmissionTimerUL, HARQ Process timer, an RV timer, a UE Active State timer, and other C-DRX-related timers.

The onDuration timer may indicate the quantity of consecutive physical downlink control channel (PDCCH) subframe(s) that the UE may read during each C-DRX cycle before entering the sleep mode. The inactivity timer may indicate the quantity of consecutive PDCCH subframe(s) during which the UE 115-*a* may be active after successfully decoding a PDCCH indicating a new transmission (e.g., for uplink and downlink transmissions). The HARQ RTT-DL and HARQ RTT-UL timers may indicate the minimum quantity of subframe(s) after new transmission is received and before the UE 115-*a* may expect a retransmission of the same packet (e.g., round trip timers for uplink and downlink transmissions). The DRX-RetransmissionTimerUL and DRX-RetransmissionTimerDL timers may indicate a maximum quantity of consecutive PDCCH subframes during which the UE 115-*a* is to remain active and wait for incoming retransmission after a first available retransmission time. The HARQ Process timer may include another timer related to HARQ processes, an RV timer may include a timer related to redundancy version, and the UE active state timer may indicate a duration for the UE 115-*a* to enter an active or awake mode upon expiration of the UE active state timer.

As an example, the UE 115-*a* may enter the C-DRX (e.g., the sleep mode) while the network entity 105-*a* assumes that an uplink retransmission timer associated with the UE 115-*a*, such as a DRX-RetransmissionTimerUL, is still running and has not yet expired. Accordingly, the network entity 105-*a* may transmit a new transmission based on the assumption that the uplink retransmission timer has not yet expired when the UE 115-*a* has actually entered sleep mode. The UE 115-*a* may have entered the sleep mode after an inactivity timer expired, for example, if no negative acknowledgement (NACK) or other signaling is received from the network entity 105-*a* for a threshold duration (e.g., 160 milliseconds (ms)). The retransmission and UE 115-*a* unavailability for receiving the retransmission (e.g., while in the sleep mode) may result in mismatched availabilities for transmission and reception of signals between the UE 115-*a* and the network entity 105-*a*.

In the wireless communications system 200, the network entity 105-*a* may communicate with the UE 115-*a* using a communication link 125. In some examples, the communication link 125 may include a first channel 225-*a* for transmitting data from the UE 115-*a* to the network entity 105-*a* and a second channel 225-*b* for transmitting data from the network entity 105-*a* to the UE 115-*a*. The communication link 125 may be an example of an NR or LTE link between the UE 115-*a* and the network entity 105-*a*. The communication link 125 may include a bi-directional link that enables both uplink and downlink communications, for example, via the channels 225. For example, the UE 115-*a* may transmit uplink messages 245 (e.g., uplink transmissions), such as uplink control signals or uplink data signals, to the network entity 105-*a* using the first channel 225-*a* (e.g., of the communication link 125) and the network entity 105-*a* may transmit downlink messages 250 (e.g., downlink transmissions), such as downlink control signals or downlink data signals, to the UE 115-*a* using the second channel 225-*b* (e.g., of the communication link 125). In some examples, the downlink messages 250 may be part of control signaling transmitted from the network entity 105-*a*.

In some examples, the UE 115-*a* may receive a first downlink message 250-*a* that updates one or more timers associated with triggering a C-DRX at the UE 115-*a*. The UE 115-*a* may transmit a first uplink message prior to an expiration of the one or more timers associated with triggering the C-DRX, where first uplink message includes an indication of whether the UE 115-*a* expects to restart the one or more timers or to enter the C-DRX following transmission of the first uplink message. The UE 115-*a* may selectively enter the C-DRX or remain in an awake state following transmission of the first uplink message based on a status of the one or more timers associated with triggering the C-DRX at the UE 115-*a* and the indication of the first uplink message.

The UE 115-*a* may transmit, prior to transmitting the first uplink message, a second uplink message 245-*b*. The second uplink message 245-*b* may indicate a capability of the UE 115-*a* to transmit the first uplink message including the indication of whether the UE 115-*a* expects to restart the one or more timers. For example, the first uplink message may be a RRC layer UE capability message that the UE 115-*a* transmits in connection with establishing or reconfiguring an RRC connection with the network entity 105-*a*. The UE 115-*a* may receive a second downlink message 250-*b* that indicates a configuration for the UE 115-*a* to transmit the first uplink message including the indication of whether the UE 115-*a* expects to restart the one or more timers based on the capability of the UE 115-*a*. In some examples, the UE 115-*a* may receive a second downlink message that enables the UE 115-*a* to transmit the first uplink message including the indication of whether the UE 115-*a* expects to restart the one or more timers.

The UE 115-*a* may receive, prior to the expiration of the one or more timers associated with triggering the C-DRX, a third downlink message 250-*c*. The third downlink message 250-*c* may include an indication of whether a network entity 105-*a* expects to start a discontinuous reception downlink retransmission timer following transmission of the third downlink message 250-*c*. In some examples, the third downlink message 250-*c* may include a physical downlink shared channel (PDSCH) transmission including a medium access control (MAC) control element (MAC-CE). The MAC-CE may include the indication of whether the network entity 105-*a* expects to start the discontinuous reception downlink retransmission timer following transmission of the third downlink message 250-*c*. Alternatively, the third downlink message 250-*c* may include downlink control information (DCI) on a PDCCH according to a DCI format that includes the indication of whether the network entity 105-*a* expects to start the discontinuous reception downlink retransmission timer following the transmission of the third downlink message 250-*c*.

In some examples, the indication of whether the UE 115-*a* expects to restart the one or more timers may be based on one or more of: a power level associated with the UE 115-*a*, an expectation of one or more downlink messages from a network entity 105-*a*, or an expectation of one or more uplink message by the UE 115-*a*. For example, if a battery level of the UE 115-*a* is relatively low (e.g., below a defined threshold), the UE 115-*a* may expect not to restart the one or more timers and enter the sleep state. Conversely, if the battery level of the UE 115-*a* is relatively high (e.g., above the defined threshold), the UE 115-*a* may expect to restart the one or more timers and remain in the awake state. Similarly, if the UE 115-*a* expects to receive one or more downlink messages from the network entity 105-*a* (e.g., based on signaling from the network entity 105-*a* or a known or predicted pattern of downlink transmissions by the network entity 105-*a*) or to transmit one or more uplink messages to the network entity 105-*a* (e.g., according to pending messages in a transmit buffer or a known or predicted pattern of uplink transmissions to the network entity 105-*a*), the UE 115-*a* may expect to restart the one or more timers and remain in the awake state. If the UE 115-*a* does not expect to receive downlink messages or transmit uplink messages in the near term, the UE 115-*a* may expect to not reset the one or more timers and enter the sleep state. In some examples, the first uplink message 245-*a* may be a last uplink transmission by the UE 115-*a* prior to the expiration of the one or more timers.

In some examples, the network entity 105-*a* may output a first downlink message 250-*a* that updates one or more timers associated with triggering a C-DRX for uplink messages 245 from a UE 115-*a*. The network entity 105-*a* may obtain a first uplink message 245-*a* prior to an expiration of the one or more timers associated with triggering the C-DRX. The first uplink message 245-*a* may include an indication of whether the UE 115-*a* expects to restart the one or more timers or to enter the CDR-X following reception of the first downlink message 250-*a* at the UE 115-*a*. In some examples, the network entity 105-*a* may output a second downlink message 250-*b* based on the indication of the UE 115-*a* expecting to restart the one or more timers. Accordingly, the uplink messages 245 and the downlink messages 250 described herein may facilitate the coordinated transmissions, which may reduce latencies otherwise associated with retransmission of information that was not received due to the UE 115-*a* and/or the network entity 105-*a* entering C-DRX.

Figure 3:
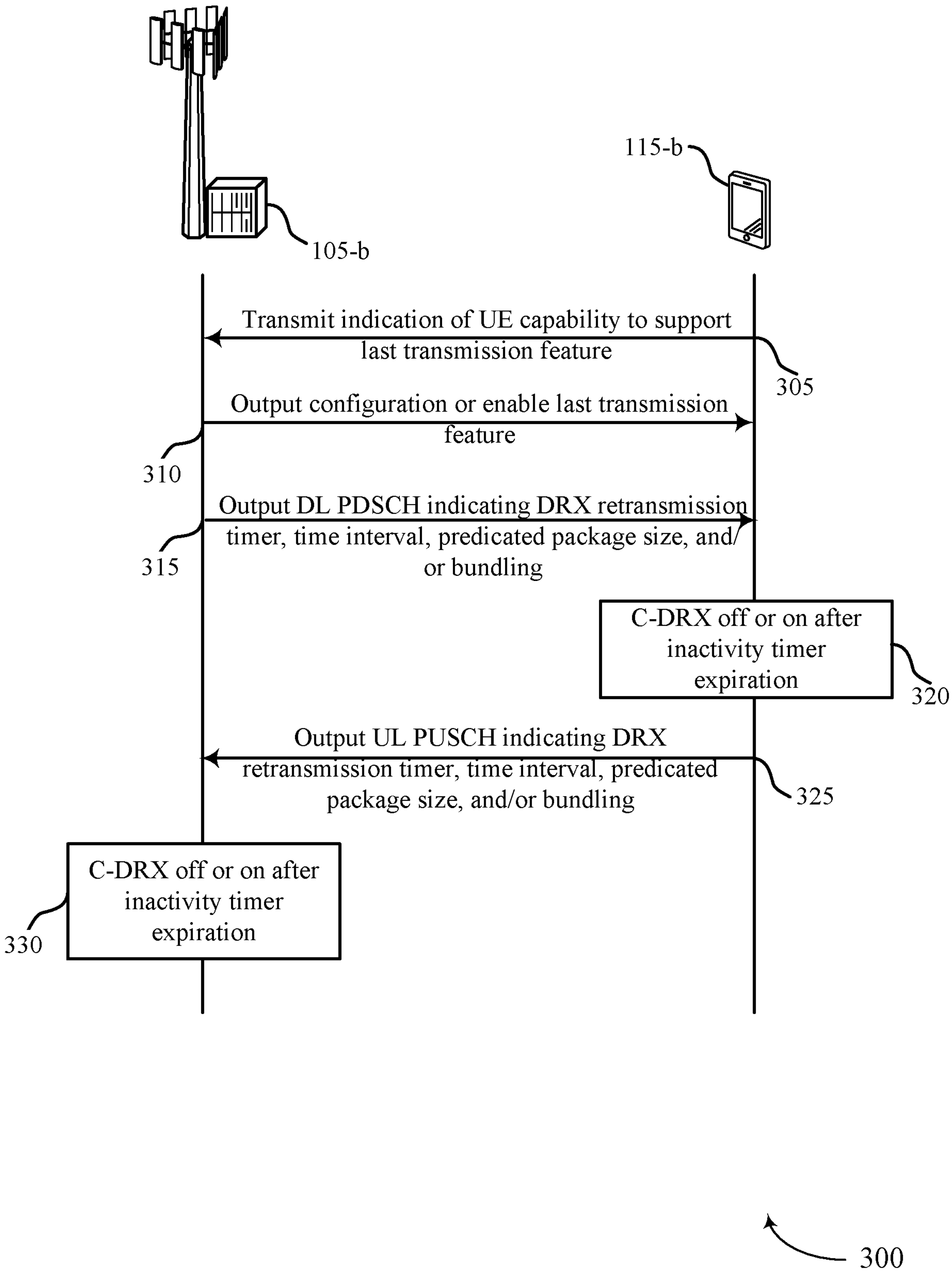
FIG. 3 shows an example of a process flow that supports coordinating DRX timers between a UE and a network entity in accordance with one or more aspects of the present disclosure.

FIG. 3 shows an example of a process flow 300 that supports coordinating DRX timers between a UE and a network entity in accordance with one or more aspects of the present disclosure. The process flow 300 may implement aspects of or may be implemented by aspects of the wireless communications system 100 or the wireless communications system 200. For example, the process flow 300 may include a UE 115-*b* and a network entity 105-*b*, which may be an example of a UE 115 and a network entity 105 as described herein. In the following description of the process flow 300, the operations performed by the UE 115-*b* and the network entity 105-*b*, may be performed in different orders or at different times than the exemplary order shown. Some operations may also be omitted from the process flow 300, or other operations may be added to the process flow 300. Further, while operations in the process flow 300 are illustrated as being performed by the UE 115-*b* and the network entity 105-*b*, the examples herein are not to be construed as limiting, as the described features may be associated with any quantity of different devices.

At 305, the UE 115-*b* may transmit signaling indicating a UE capability to the network entity 105-*b*. The signaling may indicate that the UE 115-*b* supports a last transmission feature for coordinating DRX timers between the UE 115-*b* and the network entity 105-*b*, for example, in a last transmission prior to expiration of one or more timers. The signaling may include, for example, an RRC UE capability message or information element indicating support for the feature. At 310, in accordance with the indicated UE capability, the network entity 105-*b* may output signaling to the UE 115-*b* that configures or instructs the UE 115-*b* to enable the last transmission feature.

At 315, the network entity 105-*b* may send a downlink PDSCH (DL PDSCH) transmission to the UE 115-*b*. The PDSCH transmission may be the last PDSCH transmission before one or more timers (e.g., an inactivity timer, a DRX Downlink Retransmission Timer (e.g., DRX-RetransmissionTimerDL), and/or a Downlink HARQ Round Trip Time (RTT) timer) associated with entering a C-DRX sleep state that are expected to expire at the network entity 105-*b*. The PDSCH transmission may include an indication (e.g., via a MAC-CE) that the PDSCH is the last transmission by the network entity 105-*b* before the expected expiration of the one or more timers. Additionally, or alternatively, the PDSCH transmission may include an express or implicit indication (e.g., via the MAC-CE) of whether the network entity 105-*b* expects to reset any of the one or more timers, and/or whether the network entity 105-*b* expects to enter the C-DRX sleep mode based on the expected expiration of the one or more timers. Following reception of the PDSCH transmission, the UE 115-*b* may determine that the network entity 105-*b* is asleep (e.g., in the C-DRX sleep mode) or not asleep (e.g., in the awake mode) based on the indication, for example, rather than assuming or not having knowledge of subsequent activity or inactivity at the network entity 105-*b*. In some examples, the network entity 105-*b* may indicate that the network entity 105-*b* is not restarting the one or more timer based on network conditions, such as to reduce power consumption.

In some examples, the network entity 105-*b* may also transmit signaling (e.g., in the last PDSCH prior to expiration of the C-DRX inactivity timer) indicating a time interval during which the network entity 105-*b* will enter C-DRX so that the UE 115-*b* may coordinate accordingly. For example, the UE 115-*b* may delay uplink transmissions until after the time interval has passed or the UE 115-*b* may also enter the C-DRX since the network entity 105-*b* is otherwise unavailable for receiving the uplink signals.

In some examples, the network entity 105-*b* may transmit signaling (e.g., in the last PDSCH prior to expiration of the C-DRX inactivity timer) indicating a predicated downlink grant transport block size for a subsequent downlink data package and/or an indication of bundling data. For example, the network entity 105-*b* may wait until a downlink package size meets a threshold size and/or is bundled based on a threshold quantity of bundling. The UE 115-*b* may enter the C-DRX sleep state during this time because the network entity 105-*b* is not expected to send downlink transmissions until the grant size is met or until the bundle is complete. At 320, the UE 115-*b* may enter the C-DRX sleep state or not enter the C-DRX sleep state (e.g., C-DRX on or C-DRX off) after the inactivity timer expires, for example, based on the indication from the network entity 105-*b* in the last PDSCH.

In some examples, at 325, the UE 115-*b* may send a last uplink physical uplink shared channel (UL PUSCH) before an expected expiration of one or more timers associated with entering a C-DRX sleep state (e.g., an inactivity timer, a DRX Uplink Retransmission Timer (DRX-Retransmission-TimerUL, and/or an Uplink HARQ RTT timer) expires, and the PUSCH may indicate (e.g., via a MAC-CE included with or in the PUSCH) whether the UE 115-*b* will reset or not reset (e.g., extend or not extend, start or not restart) the one or more timers. In other words, the PUSCH may include an indication of whether the UE expects to imminently enter the C-DRX sleep state. The network entity 105-*b* may determine that the UE 115-*b* is asleep or not asleep based on the indication, for example, rather than assuming or not having knowledge of subsequent activity or inactivity at the UE 115-*b*. In some examples, the UE 115-*b* may indicate that the UE 115-*b* is not restarting the one or more timers, that is, that the UE expects to enter the C-DRX sleep state, based on UE conditions, such as battery power (e.g., a battery level that is below a defined threshold) and/or to reduce power consumption at the UE 115-*b*.

In some examples, the UE 115-*b* may transmit signaling (e.g., in the last PUSCH prior to expiration of the C-DRX inactivity timer) indicating a time interval during which the UE 115-*b* will enter C-DRX so that the network entity 105-*b* may coordinate accordingly. For example, the network entity 105-*b* may delay transmissions until after the interval or the network entity 105-*b* may also enter the C-DRX since the UE 115-*b* is unavailable for receiving and decoding the downlink transmissions.

In some examples, the UE 115-*b* may also transmit signaling (e.g., in the last PUSCH prior to expiration of the C-DRX inactivity timer) indicating a predicated package size for a subsequent uplink data package and/or an indication of bundling data. For example, the UE 115-*b* may wait until an uplink package size meets a threshold size and/or is bundled based on a threshold quantity of bundling. The network entity 105-*b* may enter the C-DRX sleep state during this time because the UE 115-*b* will not be sending uplink transmissions until the package size is met or until the bundle is complete. At 330, the network entity 105-*b* may enter the C-DRX sleep state or not enter the C-DRX sleep state (e.g., C-DRX on or C-DRX off) after the inactivity timer expires, for example, based on the indication from the UE 115-*b* in the last PUSCH. Accordingly, the coordinated transmission discussed herein, such as the last PUSCH or PDSCH prior to expiration of the one or more timers, may reduce mismatch between the UE 115-*b* and the network entity 105-*b* on C-DRX statuses. The reduced mismatch also reduce data package loss, real-time package loss, reduce latencies associated with transmissions and retransmissions, as well as facilitate user experience and voice over internet protocol systems to operate as expected (e.g., above a threshold).

Figure 4:
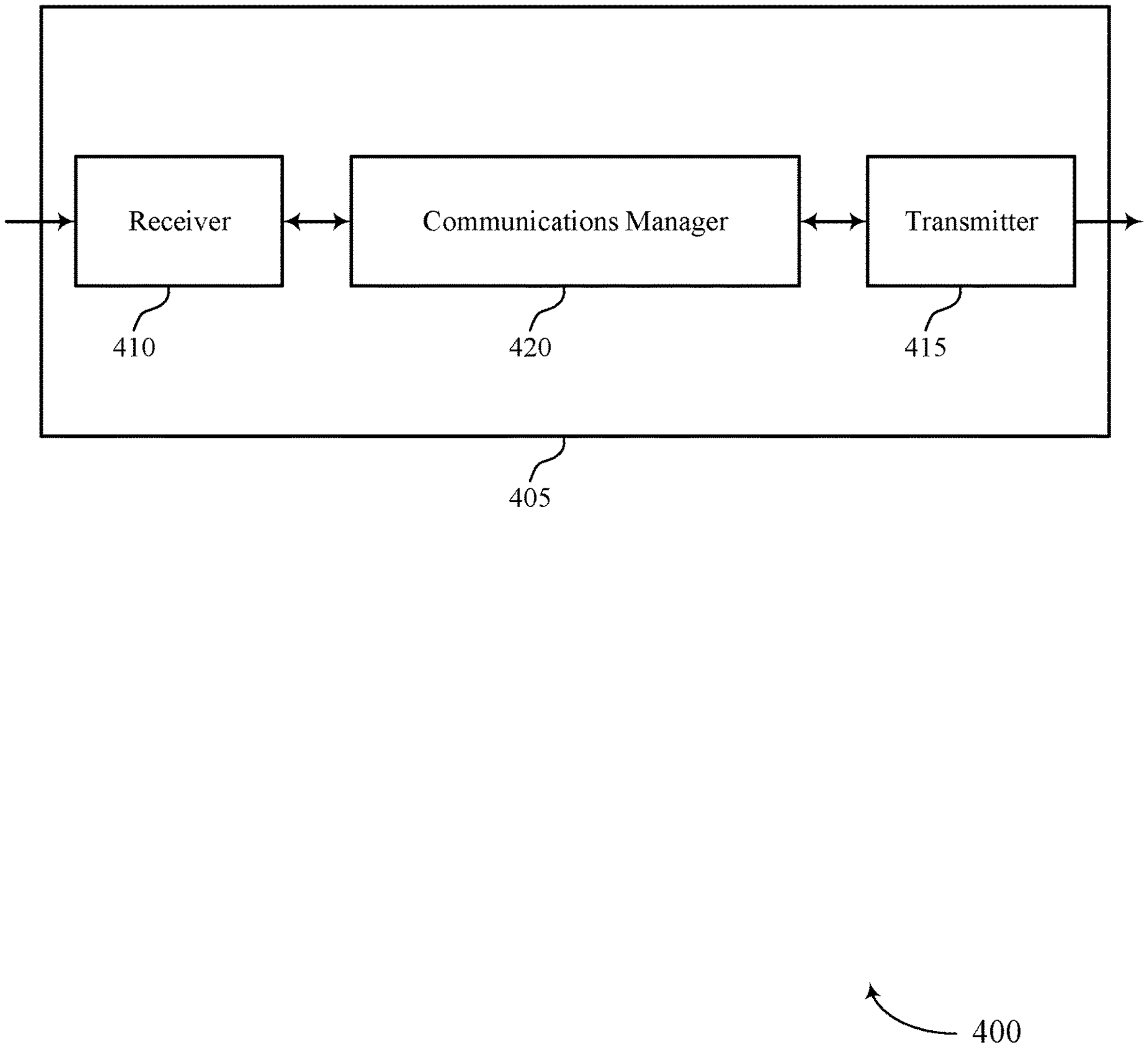
FIGS. 4 and 5 show block diagrams of devices that support coordinating DRX timers between a UE and a network entity in accordance with one or more aspects of the present disclosure.

FIG. 4 shows a block diagram 400 of a device 405 that supports coordinating DRX timers between a UE and a network entity in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to coordinated transmissions). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to coordinated transmissions). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of coordinated transmissions as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), a graphics processing unit (GPU), a neural processing unit (NPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software) executed by at least one processor. If implemented in code executed by at least one processor, the functions of the communications manager 420, the receiver 410, the transmitter 415, or various combinations or components thereof may be performed by a general-purpose processor, a DSP, a CPU, a GPU, a NPU, an ASIC, an FPGA, a microcontroller, or any combination of these or other programmable logic devices (e.g., configured as or otherwise supporting, individually or collectively, a means for performing the functions described in the present disclosure). The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein.

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving a first downlink message that updates one or more timers associated with triggering a C-DRX at the UE. The communications manager 420 is capable of, configured to, or operable to support a means for transmitting a first uplink message prior to an expiration of the one or more timers associated with triggering the C-DRX, the first uplink message including an indication of whether the UE expects to restart the one or more timers or to enter the C-DRX following transmission of the first uplink message. The communications manager 420 is capable of, configured to, or operable to support a means for selectively entering the C-DRX or remaining in an awake state following transmission of the first uplink message based on a status of the one or more timers associated with triggering the C-DRX at the UE and the indication of the first uplink message.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for coordinated transmissions to reduce latencies associated with retransmissions and also reduce power consumption.

Figure 5:
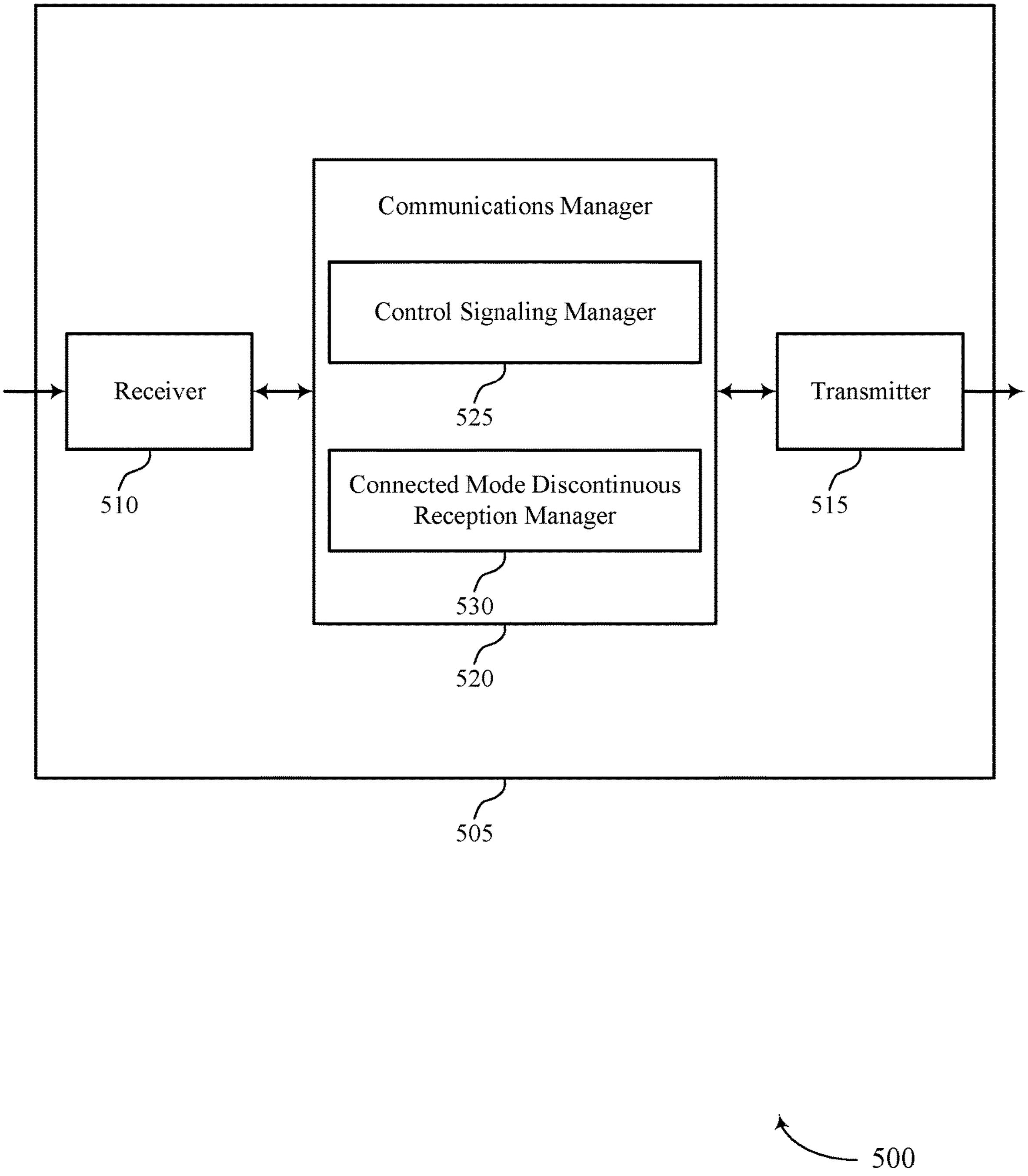

FIG. 5 shows a block diagram 500 of a device 505 that supports coordinating DRX timers between a UE and a network entity in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to coordinated transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to coordinated transmissions). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of coordinated transmissions as described herein. For example, the communications manager 520 may include a control signaling manager 525 a C-DRX manager 530, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The control signaling manager 525 is capable of, configured to, or operable to support a means for receiving a first downlink message that updates one or more timers associated with triggering a C-DRX at the UE. The control signaling manager 525 is capable of, configured to, or operable to support a means for transmitting a first uplink message prior to an expiration of the one or more timers associated with triggering the C-DRX, the first uplink message including an indication of whether the UE expects to restart the one or more timers or to enter the C-DRX following transmission of the first uplink message. The C-DRX manager 530 is capable of, configured to, or operable to support a means for selectively entering the C-DRX or remaining in an awake state following transmission of the first uplink message based on a status of the one or more timers associated with triggering the C-DRX at the UE and the indication of the first uplink message.

Figure 6:
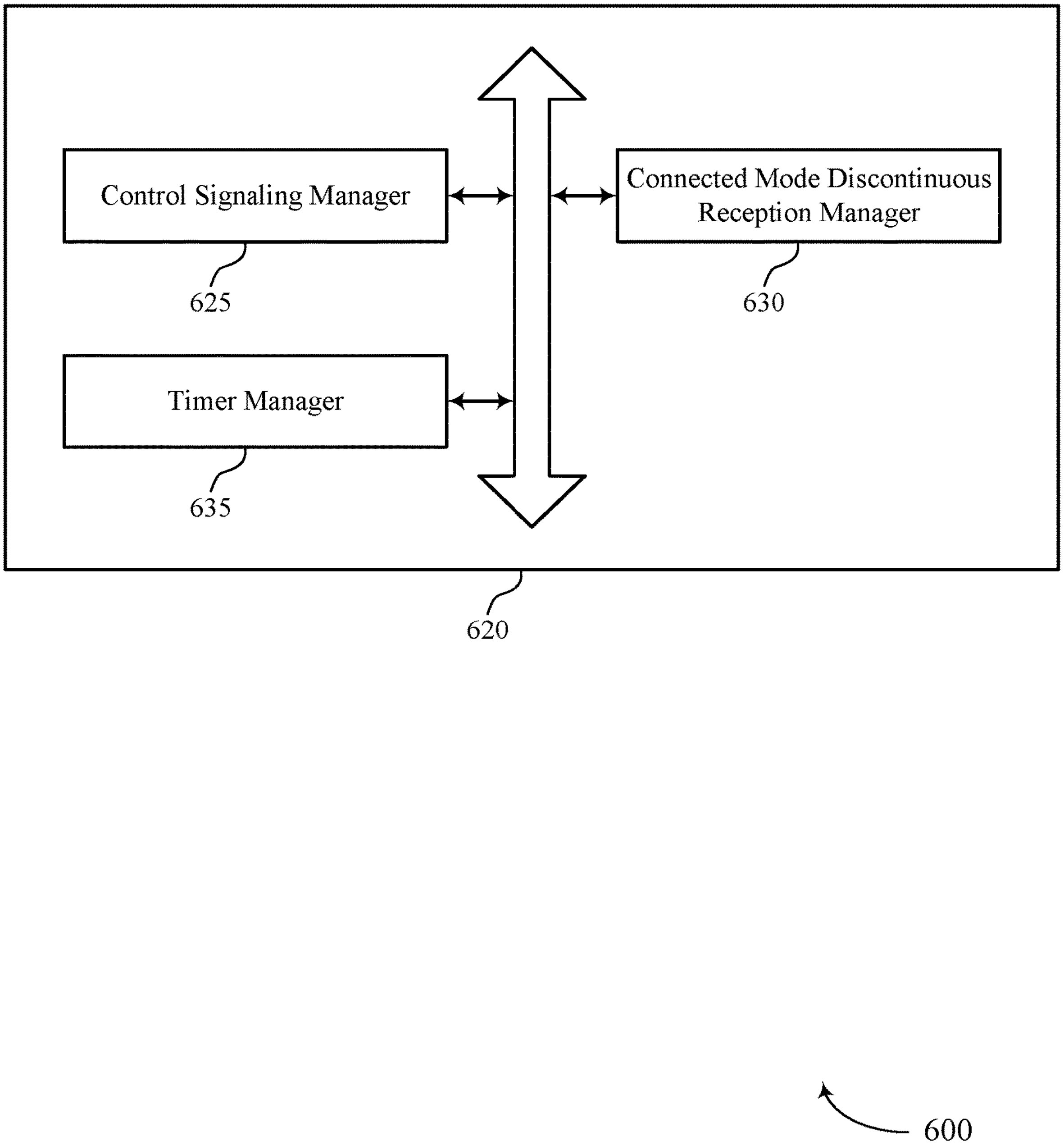
FIG. 6 shows a block diagram of a communications manager that supports coordinating DRX timers between a UE and a network entity in accordance with one or more aspects of the present disclosure.

FIG. 6 shows a block diagram 600 of a communications manager 620 that supports coordinating DRX timers between a UE and a network entity in accordance with one or more aspects of the present disclosure. The communications manager 620 may be an example of aspects of a communications manager 420, a communications manager 520, or both, as described herein. The communications manager 620, or various components thereof, may be an example of means for performing various aspects of coordinated transmissions as described herein. For example, the communications manager 620 may include a control signaling manager 625, a C-DRX manager 630, a timer manager 635, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The control signaling manager 625 is capable of, configured to, or operable to support a means for receiving a first downlink message that updates one or more timers associated with triggering a C-DRX at the UE. In some examples, the control signaling manager 625 is capable of, configured to, or operable to support a means for transmitting a first uplink message prior to an expiration of the one or more timers associated with triggering the C-DRX, the first uplink message including an indication of whether the UE expects to restart the one or more timers or to enter the C-DRX following transmission of the first uplink message. The C-DRX manager 630 is capable of, configured to, or operable to support a means for selectively entering the C-DRX or remaining in an awake state following transmission of the first uplink message based on a status of the one or more timers associated with triggering the C-DRX at the UE and the indication of the first uplink message.

In some examples, the control signaling manager 625 is capable of, configured to, or operable to support a means for transmitting, prior to transmitting the first uplink message, a second uplink message indicating a capability of the UE to transmit the first uplink message including the indication of whether the UE expects to restart the one or more timers.

In some examples, the control signaling manager 625 is capable of, configured to, or operable to support a means for receiving a second downlink message indicating a configuration for the UE to transmit the first uplink message including the indication of whether the UE expects to restart the one or more timers based on the capability of the UE.

In some examples, the control signaling manager 625 is capable of, configured to, or operable to support a means for receiving a second downlink message enabling the UE to transmit the first uplink message including the indication of whether the UE expects to restart the one or more timers.

In some examples, the control signaling manager 625 is capable of, configured to, or operable to support a means for receiving, prior to the expiration of the one or more timers associated with triggering the C-DRX, a third downlink message including an indication of whether a network entity expects to start a discontinuous reception downlink retransmission timer following transmission of the third downlink message.

In some examples, the third downlink message includes an PDSCH transmission including a medium access control (MAC) control element (MAC-CE), the MAC-CE including the indication of whether the network entity expects to start the discontinuous reception downlink retransmission timer following transmission of the third downlink message.

In some examples, a power level associated with the UE, an expectation of one or more downlink messages from a network entity, or an expectation of one or more uplink message by the UE.

In some examples, the first uplink message is a last uplink transmission by the UE prior to the expiration of the one or more timers.

Figure 7:
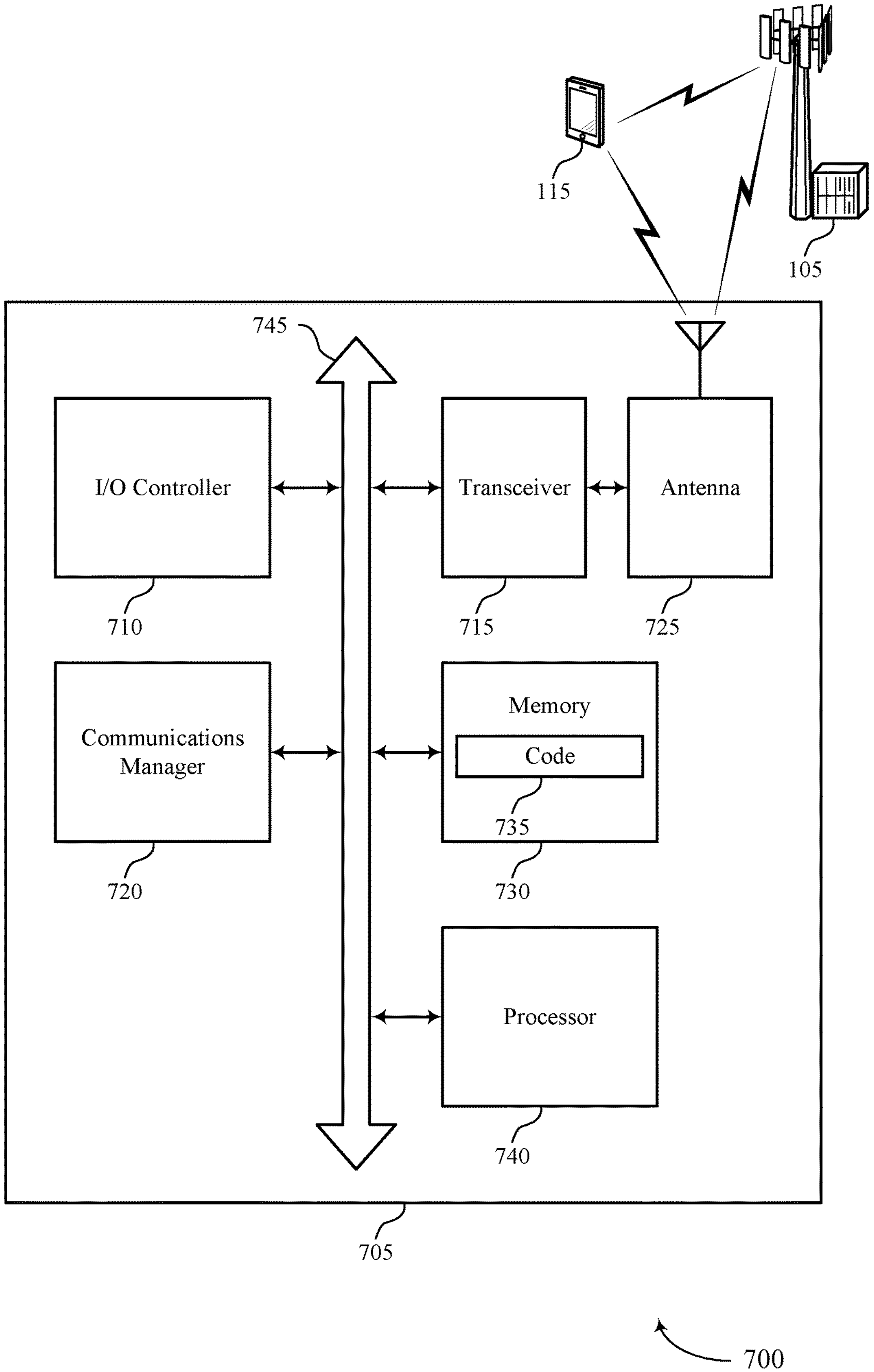
FIG. 7 shows a diagram of a system including a device that supports coordinating DRX timers between a UE and a network entity in accordance with one or more aspects of the present disclosure.

FIG. 7 shows a diagram of a system 700 including a device 705 that supports coordinating DRX timers between a UE and a network entity in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a GPU, a NPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting coordinated transmissions). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for receiving a first downlink message that updates one or more timers associated with triggering a C-DRX at the UE. The communications manager 720 is capable of, configured to, or operable to support a means for transmitting a first uplink message prior to an expiration of the one or more timers associated with triggering the C-DRX, the first uplink message including an indication of whether the UE expects to restart the one or more timers or to enter the C-DRX following transmission of the first uplink message. The communications manager 720 is capable of, configured to, or operable to support a means for selectively entering the C-DRX or remaining in an awake state following transmission of the first uplink message based on a status of the one or more timers associated with triggering the C-DRX at the UE and the indication of the first uplink message.

By including or configuring the communications manager 720 in accordance with examples as described herein, the device 705 may support techniques for coordinated transmissions to reduce latencies associated with retransmissions and also reduce power consumption.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of coordinated transmissions as described herein, or the at least one processor 740 and the at least one memory 730 may be otherwise configured to, individually or collectively, perform or support such operations.

Figure 8:
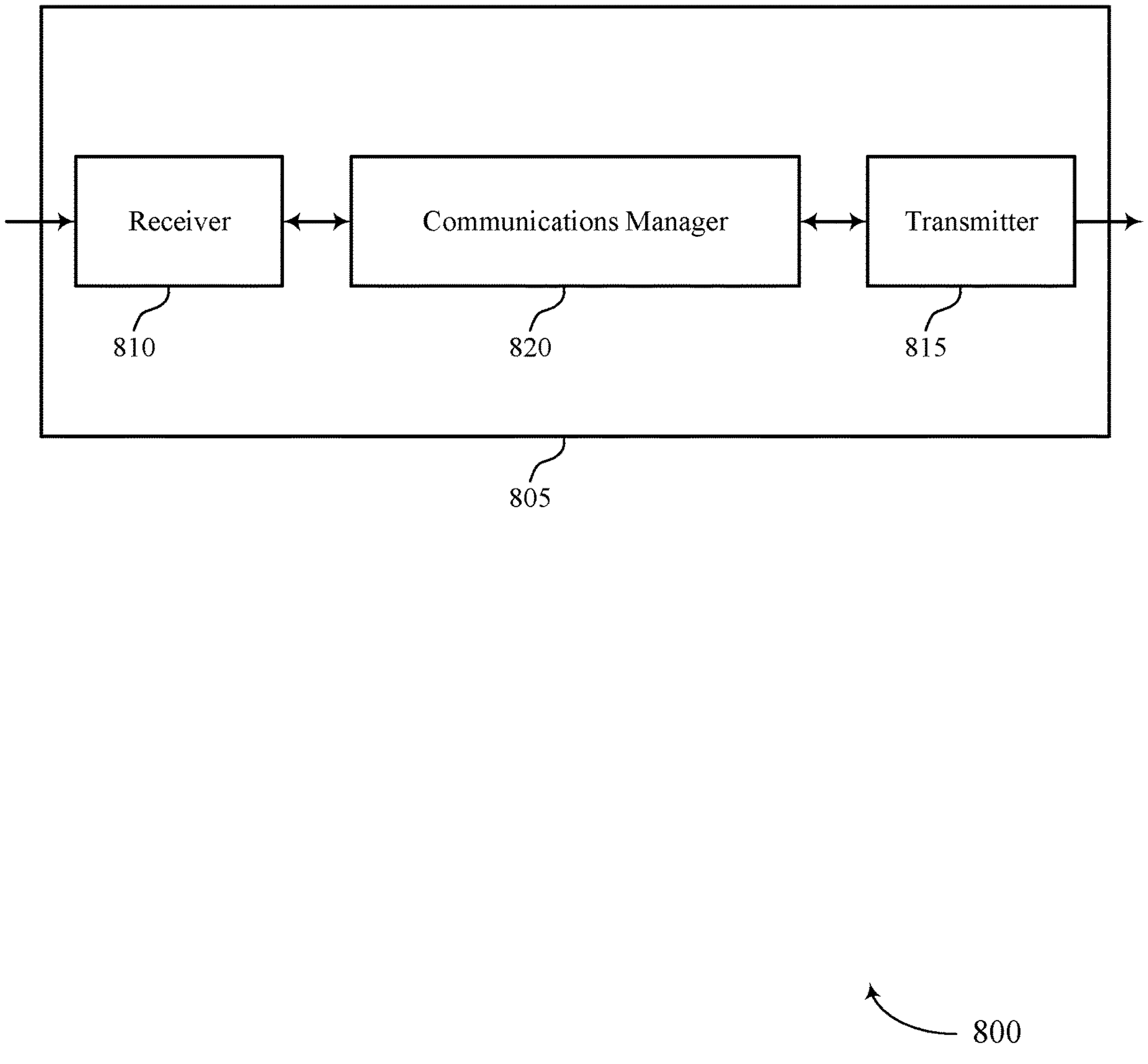
FIGS. 8 and 9 show block diagrams of devices that support coordinating DRX timers between a UE and a network entity in accordance with one or more aspects of the present disclosure.

FIG. 8 shows a block diagram 800 of a device 805 that supports coordinating DRX timers between a UE and a network entity in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of coordinated transmissions as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, a GPU, a NPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software) executed by at least one processor. If implemented in code executed by at least one processor, the functions of the communications manager 820, the receiver 810, the transmitter 815, or various combinations or components thereof may be performed by a general-purpose processor, a DSP, a CPU, a GPU, a NPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for outputting a first downlink message that updates one or more timers associated with triggering a C-DRX for uplink messages from a UE. The communications manager 820 is capable of, configured to, or operable to support a means for obtaining a first uplink message prior to an expiration of the one or more timers associated with triggering the C-DRX, the first uplink message including an indication of whether the UE expects to restart the one or more timers or to enter the C-DRX following reception of the first downlink message at the UE.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for coordinated transmissions to reduce latencies associated with retransmissions and also reduce power consumption.

Figure 9:
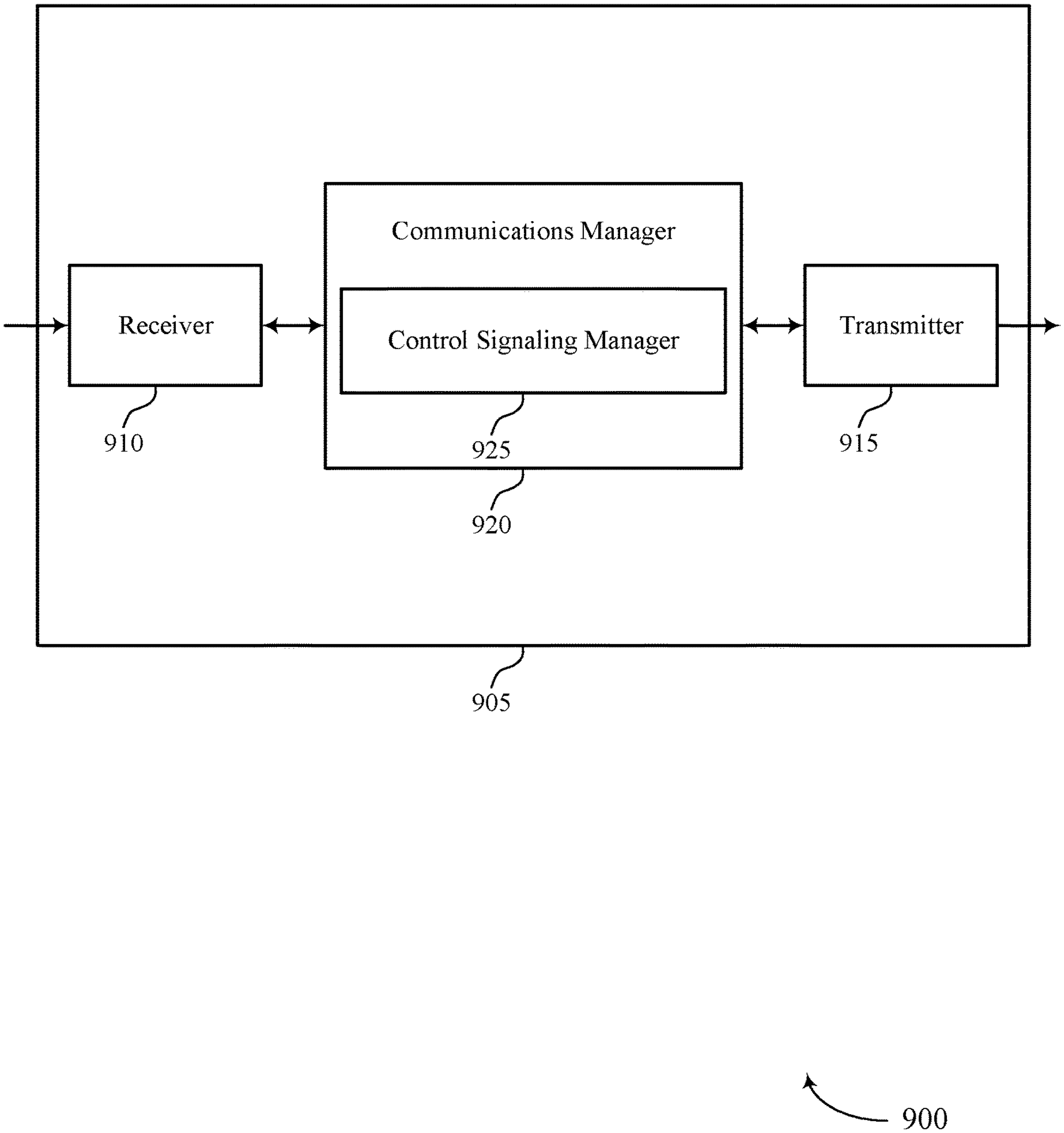

FIG. 9 shows a block diagram 900 of a device 905 that supports coordinating DRX timers between a UE and a network entity in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of coordinated transmissions as described herein. For example, the communications manager 920 may include a control signaling manager 925. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The control signaling manager 925 is capable of, configured to, or operable to support a means for outputting a first downlink message that updates one or more timers associated with triggering a C-DRX for uplink messages from a UE. The control signaling manager 925 is capable of, configured to, or operable to support a means for obtaining a first uplink message prior to an expiration of the one or more timers associated with triggering the C-DRX, the first uplink message including an indication of whether the UE expects to restart the one or more timers or to enter the C-DRX following reception of the first downlink message at the UE.

Figure 10:
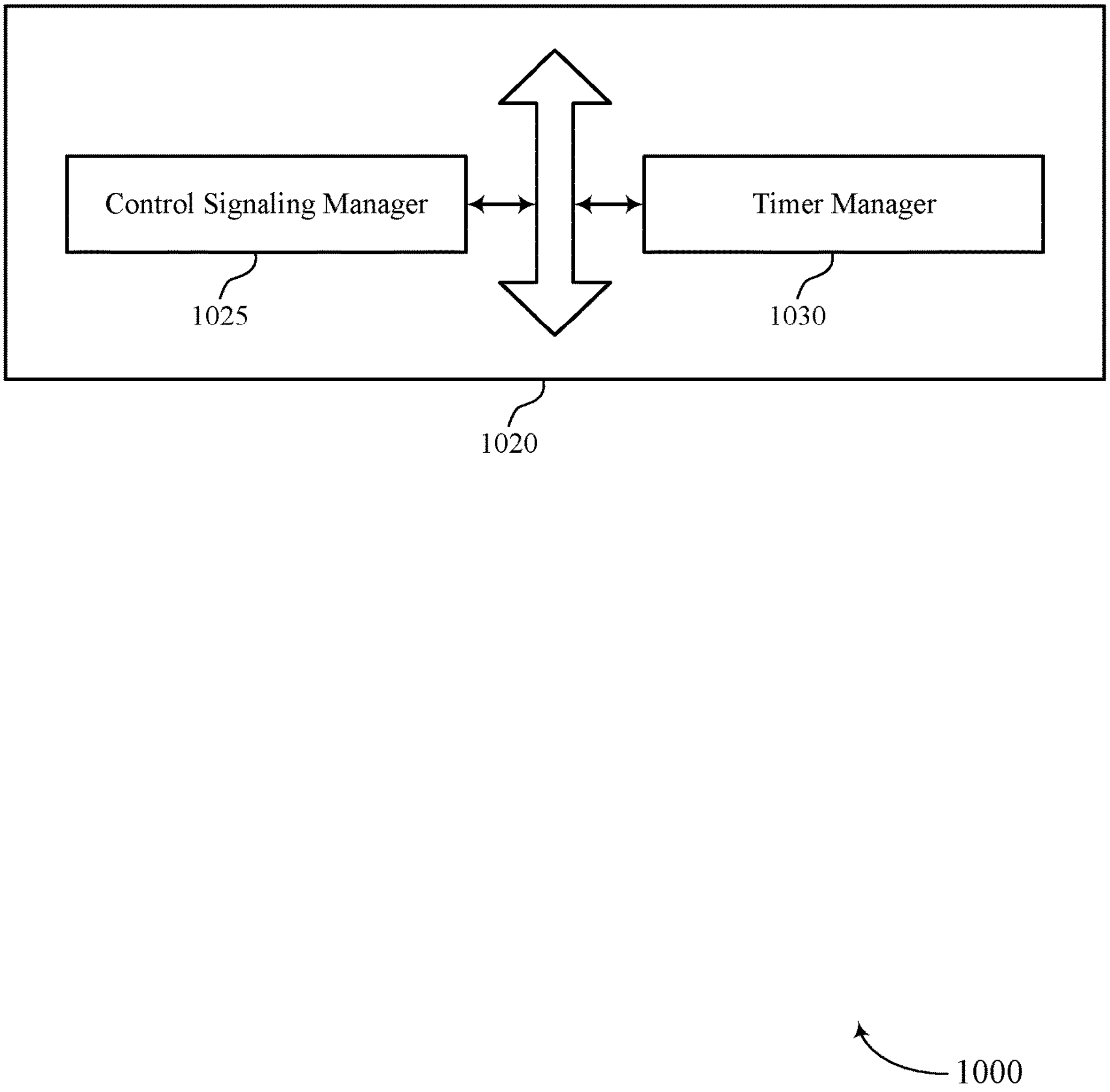
FIG. 10 shows a block diagram of a communications manager that supports coordinating DRX timers between a UE and a network entity in accordance with one or more aspects of the present disclosure.

FIG. 10 shows a block diagram 1000 of a communications manager 1020 that supports coordinating DRX timers between a UE and a network entity in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of coordinated transmissions as described herein. For example, the communications manager 1020 may include a control signaling manager 1025, a timer manager 1030, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The control signaling manager 1025 is capable of, configured to, or operable to support a means for outputting a first downlink message that updates one or more timers associated with triggering a C-DRX for uplink messages from a UE. The control signaling manager 1025 is capable of, configured to, or operable to support a means for obtaining a first uplink message prior to an expiration of the one or more timers associated with triggering the C-DRX, the first uplink message including an indication of whether the UE expects to restart the one or more timers or to enter the C-DRX following reception of the first downlink message at the UE.

In some examples, the control signaling manager 1025 is capable of, configured to, or operable to support a means for outputting a second downlink message based on the indication of the UE expecting to restart the one or more timers.

In some examples, the control signaling manager 1025 is capable of, configured to, or operable to support a means for obtaining, prior to receiving the first uplink message, a second uplink message indicating a capability of the UE to transmit the first uplink message including the indication of whether the UE expects to restart the one or more timers.

In some examples, the control signaling manager 1025 is capable of, configured to, or operable to support a means for outputting a second downlink message indicating a configuration for the UE to transmit the first uplink message including the indication of whether the UE expects restart the one or more timers based on the capability of the UE.

In some examples, the control signaling manager 1025 is capable of, configured to, or operable to support a means for outputting a second downlink message enabling the UE to transmit the first uplink message including the indication of whether the UE expects to restart the one or more timers.

In some examples, the control signaling manager 1025 is capable of, configured to, or operable to support a means for outputting, prior to the expiration of the one or more timers associated with triggering the C-DRX, a third downlink message including an indication of whether the network entity expects to start a discontinuous reception downlink retransmission timer following transmission of the third downlink message.

In some examples, the third downlink message includes an PDSCH transmission including a medium access control (MAC) control element (MAC-CE), the MAC-CE including the indication of whether the network entity expects to start the discontinuous reception downlink retransmission timer following transmission of the third downlink message.

In some examples, the indication of whether the UE expects to restart the one or more timers is based on one or more of: a power level associated with the UE, an expectation of one or more downlink messages from a network entity, or an expectation of one or more uplink message by the UE.

In some examples, the first uplink message is a last uplink transmission by the UE prior to the expiration of the one or more timers.

Figure 11:
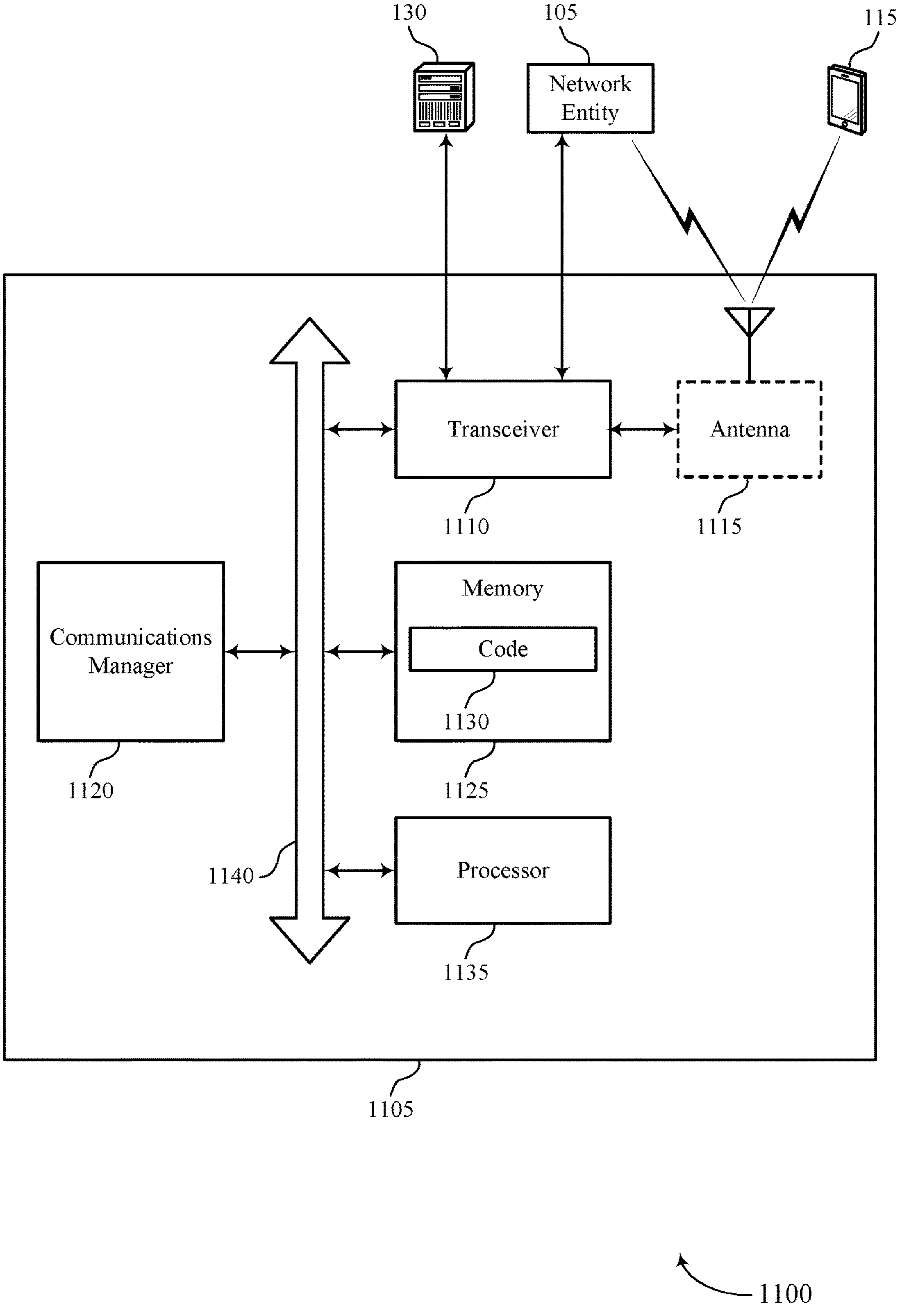
FIG. 11 shows a diagram of a system including a device that supports coordinating DRX timers between a UE and a network entity in accordance with one or more aspects of the present disclosure.

FIG. 11 shows a diagram of a system 1100 including a device 1105 that supports coordinating DRX timers between a UE and a network entity in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting coordinated transmissions). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. For example, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for outputting a first downlink message that updates one or more timers associated with triggering a C-DRX for uplink messages from a UE. The communications manager 1120 is capable of, configured to, or operable to support a means for obtaining a first uplink message prior to an expiration of the one or more timers associated with triggering the C-DRX, the first uplink message including an indication of whether the UE expects to restart the one or more timers or to enter the C-DRX following reception of the first downlink message at the UE.

By including or configuring the communications manager 1120 in accordance with examples as described herein, the device 1105 may support techniques for coordinated transmissions to reduce latencies associated with retransmissions and also reduce power consumption.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of coordinated transmissions as described herein, or the at least one processor 1135 and the at least one memory 1125 may be otherwise configured to, individually or collectively, perform or support such operations.

Figure 12:
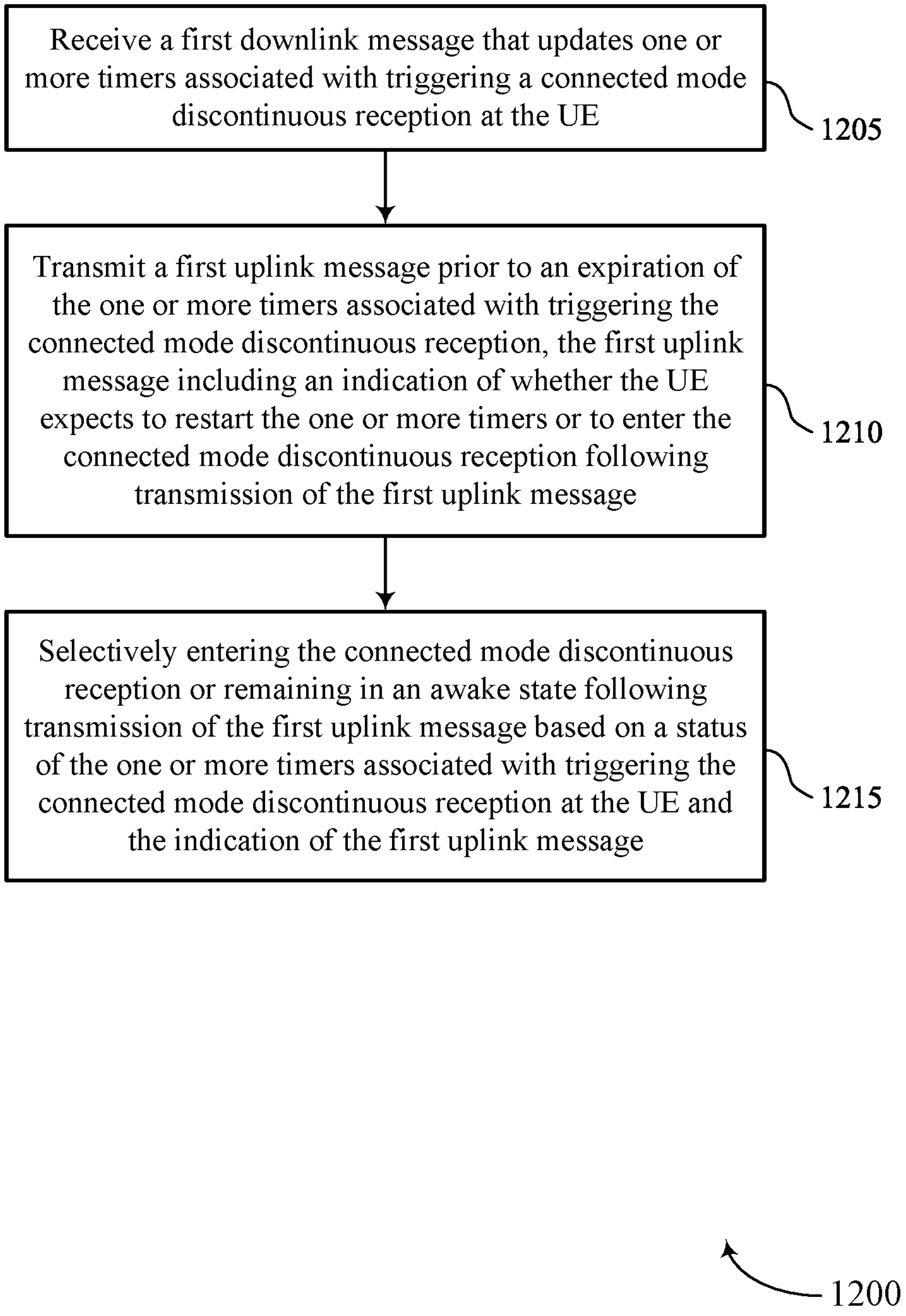
FIGS. 12 through 15 show flowcharts illustrating methods that support coordinating DRX timers between a UE and a network entity in accordance with one or more aspects of the present disclosure.

FIG. 12 shows a flowchart illustrating a method 1200 that supports coordinating DRX timers between a UE and a network entity in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a first downlink message that updates one or more timers associated with triggering a C-DRX at the UE. The operations of block 1205 may be performed in accordance with examples as disclosed herein. In some examples, aspects of the operations of 1205 may be performed by a control signaling manager 625 as described with reference to FIG. 6.

At 1210, the method may include transmitting a first uplink message prior to an expiration of the one or more timers associated with triggering the C-DRX, the first uplink message including an indication of whether the UE expects to restart the one or more timers or to enter the C-DRX following transmission of the first uplink message. The operations of block 1210 may be performed in accordance with examples as disclosed herein. In some examples, aspects of the operations of 1210 may be performed by a control signaling manager 625 as described with reference to FIG. 6.

At 1215, the method may include selectively entering the C-DRX or remaining in an awake state following transmission of the first uplink message based on a status of the one or more timers associated with triggering the C-DRX at the UE and the indication of the first uplink message. The operations of block 1215 may be performed in accordance with examples as disclosed herein. In some examples, aspects of the operations of 1215 may be performed by a C-DRX manager 630 as described with reference to FIG. 6.

Figure 13:
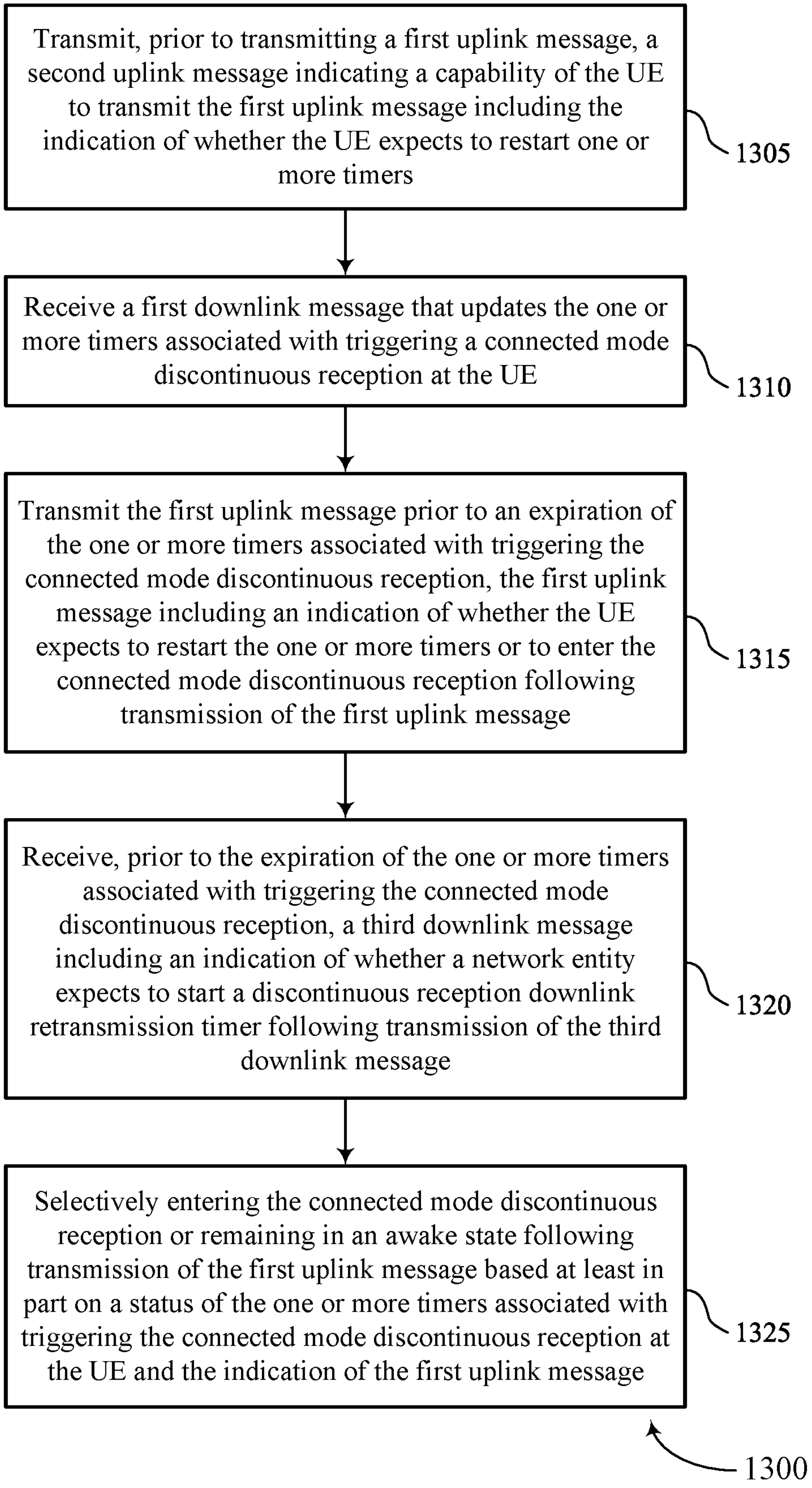

FIG. 13 shows a flowchart illustrating a method 1300 that supports coordinating DRX timers between a UE and a network entity in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include transmitting, prior to transmitting a first uplink message, a second uplink message indicating a capability of the UE to transmit the first uplink message including the indication of whether the UE expects to restart the one or more timers. The operations of block 1305 may be performed in accordance with examples as disclosed herein. In some examples, aspects of the operations of 1305 may be performed by a control signaling manager 625 as described with reference to FIG. 6.

At 1310, the method may include receiving a first downlink message that updates one or more timers associated with triggering a C-DRX at the UE. The operations of block 1310 may be performed in accordance with examples as disclosed herein. In some examples, aspects of the operations of 1310 may be performed by a control signaling manager 625 as described with reference to FIG. 6.

At 1315, the method may include transmitting the first uplink message prior to an expiration of the one or more timers associated with triggering the C-DRX, the first uplink message including an indication of whether the UE expects to restart the one or more timers or to enter the C-DRX following transmission of the first uplink message. The operations of block 1315 may be performed in accordance with examples as disclosed herein. In some examples, aspects of the operations of 1315 may be performed by a control signaling manager 625 as described with reference to FIG. 6.

At 1320, the method may include receiving, prior to the expiration of the one or more timers associated with triggering the C-DRX, a third downlink message including an indication of whether a network entity expects to start a discontinuous reception downlink retransmission timer following transmission of the third downlink message. The operations of block 1320 may be performed in accordance with examples as disclosed herein. In some examples, aspects of the operations of 1320 may be performed by a control signaling manager 625 as described with reference to FIG. 6.

At 1325, the method may include selectively entering the C-DRX or remaining in an awake state following transmission of the first uplink message based at least in part on a status of the one or more timers associated with triggering the C-DRX at the UE and the indication of the first uplink message. The operations of block 1325 may be performed in accordance with examples as disclosed herein. In some examples, aspects of the operations of 1325 may be performed by a C-DRX manager 630 as described with reference to FIG. 6.

Figure 14:
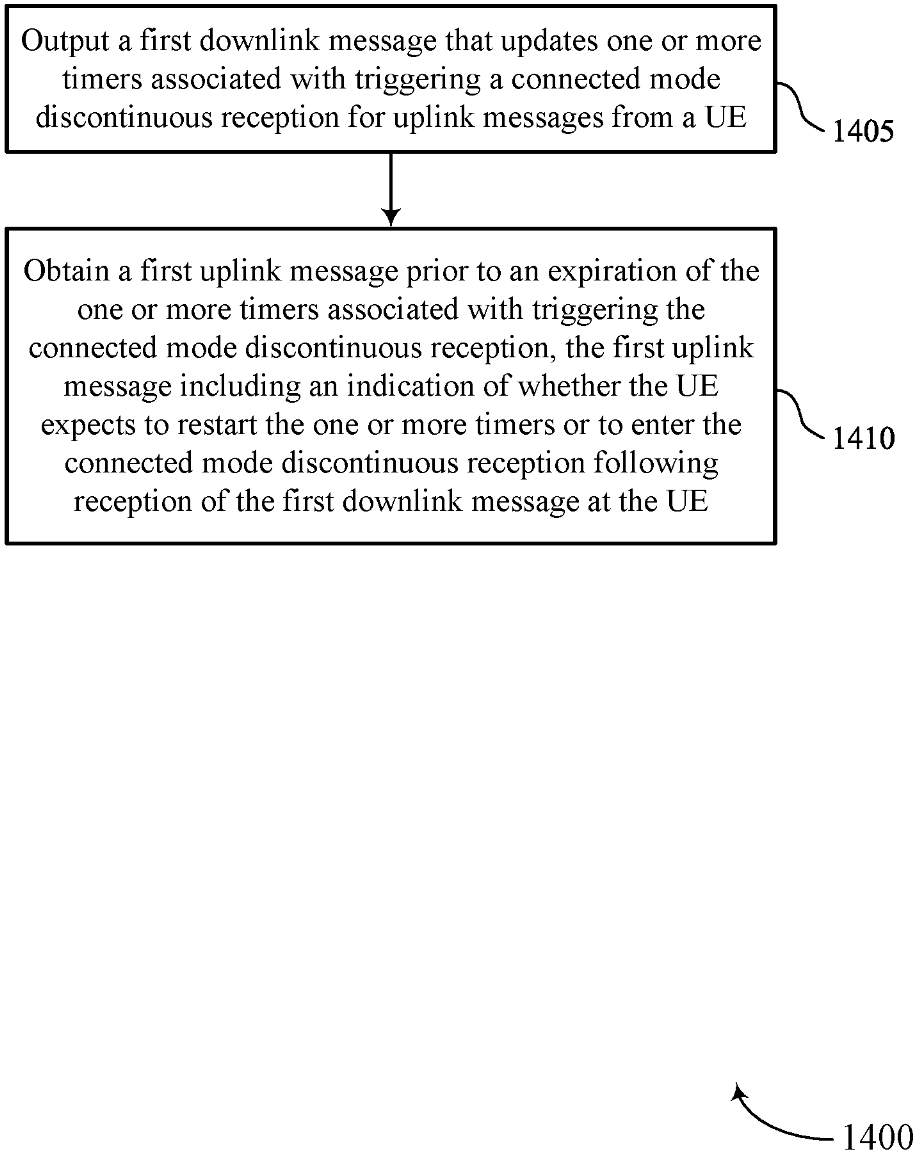

FIG. 14 shows a flowchart illustrating a method 1400 that supports coordinating DRX timers between a UE and a network entity in accordance with one or more aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include outputting a first downlink message that updates one or more timers associated with triggering a C-DRX for uplink messages from a UE. The operations of block 1405 may be performed in accordance with examples as disclosed herein. In some examples, aspects of the operations of 1405 may be performed by a control signaling manager 1025 as described with reference to FIG. 10.

At 1410, the method may include obtaining a first uplink message prior to an expiration of the one or more timers associated with triggering the C-DRX, the first uplink message including an indication of whether the UE expects to restart the one or more timers or to enter the C-DRX following reception of the first downlink message at the UE. The operations of block 1410 may be performed in accordance with examples as disclosed herein. In some examples, aspects of the operations of 1410 may be performed by a control signaling manager 1025 as described with reference to FIG. 10.

Figure 15:
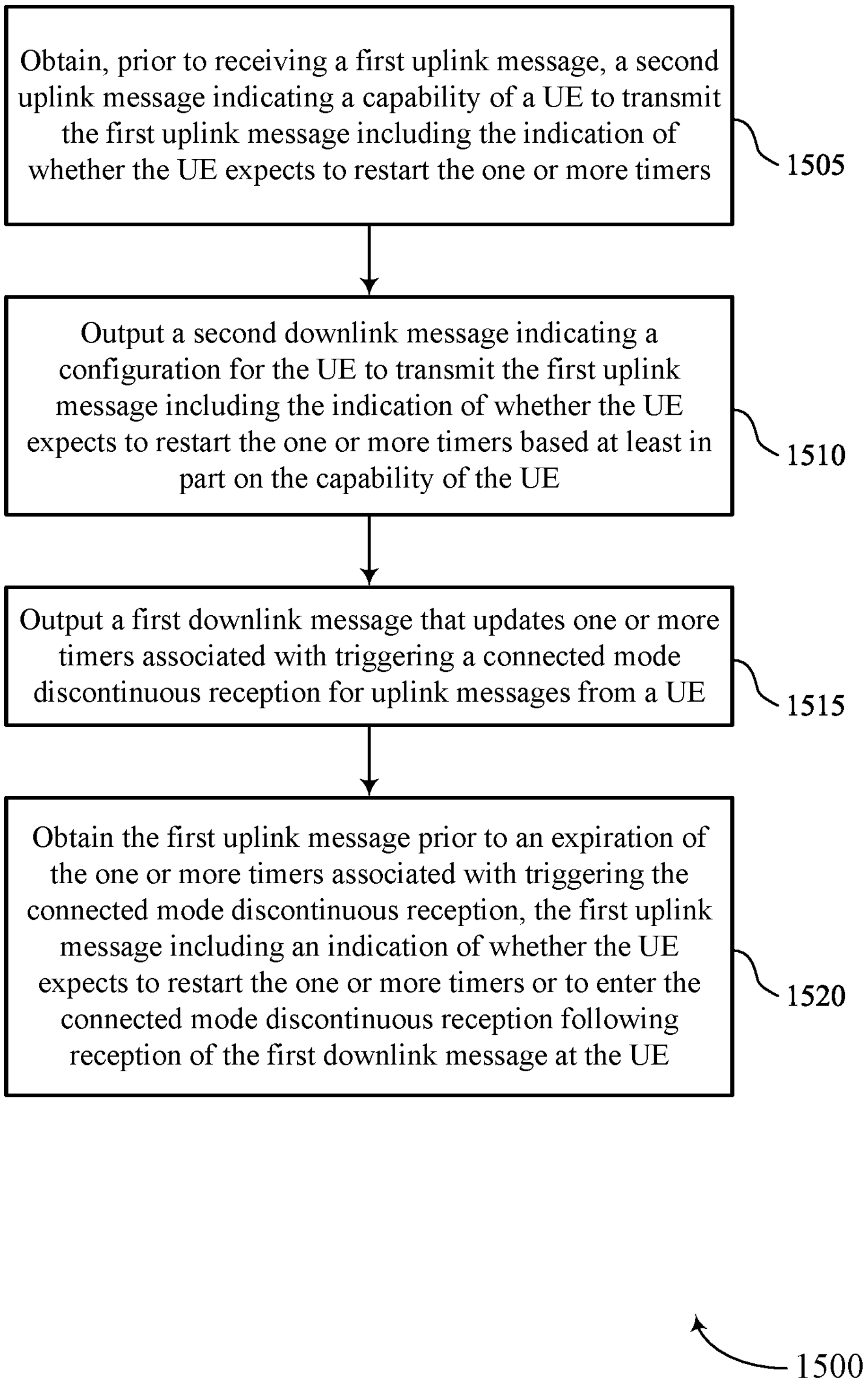

FIG. 15 shows a flowchart illustrating a method 1500 that supports coordinating DRX timers between a UE and a network entity in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include obtaining, prior to receiving a first uplink message, a second uplink message indicating a capability of the UE to transmit the first uplink message including the indication of whether the UE expects to restart the one or more timers. The operations of block 1505 may be performed in accordance with examples as disclosed herein. In some examples, aspects of the operations of 1505 may be performed by a control signaling manager 1025 as described with reference to FIG. 10.

At 1510, the method may include outputting a second downlink message indicating a configuration for the UE to transmit the first uplink message including the indication of whether the UE expects restart the one or more timers based at least in part on the capability of the UE. The operations of block 1510 may be performed in accordance with examples as disclosed herein. In some examples, aspects of the operations of 1510 may be performed by a control signaling manager 1025 as described with reference to FIG. 10.

At 1515, the method may include outputting a first downlink message that updates one or more timers associated with triggering a C-DRX for uplink messages from a UE. The operations of block 1515 may be performed in accordance with examples as disclosed herein. In some examples, aspects of the operations of 1515 may be performed by a control signaling manager 1025 as described with reference to FIG. 10.

At 1520, the method may include obtaining a first uplink message prior to an expiration of the one or more timers associated with triggering the C-DRX, the first uplink message including an indication of whether the UE expects to restart the one or more timers or to enter the C-DRX following reception of the first downlink message at the UE. The operations of block 1520 may be performed in accordance with examples as disclosed herein. In some examples, aspects of the operations of 1520 may be performed by a control signaling manager 1025 as described with reference to FIG. 10.

The following provides an overview of aspects of the present disclosure:

Aspect 1: A method for wireless communications at a UE, comprising: receiving a first downlink message that updates one or more timers associated with triggering a C-DRX at the UE; transmitting a first uplink message prior to an expiration of the one or more timers associated with triggering the C-DRX, the first uplink message including an indication of whether the UE expects to restart the one or more timers or to enter the C-DRX following transmission of the first uplink message; and selectively entering the C-DRX or remaining in an awake state following transmission of the first uplink message based at least in part on a status of the one or more timers associated with triggering the C-DRX at the UE and the indication of the first uplink message.

Aspect 2: The method of aspect 1, further comprising: transmitting, prior to transmitting the first uplink message, a second uplink message indicating a capability of the UE to transmit the first uplink message including the indication of whether the UE expects to restart the one or more timers.

Aspect 3: The method of aspect 2, further comprising: receiving a second downlink message indicating a configuration for the UE to transmit the first uplink message including the indication of whether the UE expects to restart the one or more timers based at least in part on the capability of the UE.

Aspect 4: The method of any of aspects 1 through 3, further comprising: receiving a second downlink message enabling the UE to transmit the first uplink message including the indication of whether the UE expects to restart the one or more timers.

Aspect 5: The method of any of aspects 1 through 4, further comprising: receiving, prior to the expiration of the one or more timers associated with triggering the C-DRX, a third downlink message including an indication of whether a network entity expects to start a discontinuous reception downlink retransmission timer following transmission of the third downlink message.

Aspect 6: The method of aspect 5, wherein the third downlink message comprises an PDSCH transmission including a MAC-CE, the MAC-CE including the indication of whether the network entity expects to start the discontinuous reception downlink retransmission timer following transmission of the third downlink message.

Aspect 7: The method of any of aspects 1 through 6, wherein the indication of whether the UE expects to restart the one or more timers is based at least in part on one or more of a power level associated with the UE, an expectation of one or more downlink messages from a network entity, or an expectation of one or more uplink message by the UE.

Aspect 8: The method of any of aspects 1 through 7, wherein the first uplink message is a last uplink transmission by the UE prior to the expiration of the one or more timers.

Aspect 9: A method for wireless communications at network entity, comprising: outputting a first downlink message that updates one or more timers associated with triggering a C-DRX for uplink messages from a UE; and obtaining a first uplink message prior to an expiration of the one or more timers associated with triggering the C-DRX, the first uplink message including an indication of whether the UE expects to restart the one or more timers or to enter the C-DRX following reception of the first downlink message at the UE.

Aspect 10: The method of aspect 9, further comprising: outputting a second downlink message based at least in part on the indication of the UE expecting to restart the one or more timers.

Aspect 11: The method of any of aspects 9 through 10, further comprising: obtaining, prior to receiving the first uplink message, a second uplink message indicating a capability of the UE to transmit the first uplink message including the indication of whether the UE expects to restart the one or more timers.

Aspect 12: The method of aspect 11, further comprising: outputting a second downlink message indicating a configuration for the UE to transmit the first uplink message including the indication of whether the UE expects restart the one or more timers based at least in part on the capability of the UE.

Aspect 13: The method of any of aspects 9 through 12, further comprising: outputting a second downlink message enabling the UE to transmit the first uplink message including the indication of whether the UE expects to restart the one or more timers.

Aspect 14: The method of any of aspects 9 through 13, further comprising: outputting, prior to the expiration of the one or more timers associated with triggering the C-DRX, a third downlink message including an indication of whether the network entity expects to start a discontinuous reception downlink retransmission timer following transmission of the third downlink message.

Aspect 15: The method of aspect 14, wherein the third downlink message comprises an PDSCH transmission including a medium access control MAC-CE, the MAC-CE including the indication of whether the network entity expects to start the discontinuous reception downlink retransmission timer following transmission of the third downlink message.

Aspect 16: The method of any of aspects 9 through 15, wherein the indication of whether the UE expects to restart the one or more timers is based at least in part on one or more of a power level associated with the UE, an expectation of one or more downlink messages from a network entity, or an expectation of one or more uplink message by the UE.

Aspect 17: The method of any of aspects 9 through 16, wherein the first uplink message is a last uplink transmission by the UE prior to the expiration of the one or more timers.

Aspect 18: A UE for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without pre-processing) to cause the UE to perform a method of any of aspects 1 through 8.

Aspect 19: A UE for wireless communications, comprising at least one means for performing a method of any of aspects 1 through 8.

Aspect 20: A non-transitory computer-readable medium storing code for wireless communications, the code comprising instructions executable by one or more processors (e.g., directly, indirectly, after pre-processing, without pre-processing) to perform a method of any of aspects 1 through 8.

Aspect 21: A network entity for wireless communications, comprising one or more memories storing processor-executable code, and one or more processors coupled with (e.g., operatively, communicatively, functionally, electronically, or electrically) the one or more memories and individually or collectively operable to execute the code (e.g., directly, indirectly, after pre-processing, without pre-processing) to cause the network entity to perform a method of any of aspects 9 through 17.

Aspect 22: A network entity for wireless communications, comprising at least one means for performing a method of any of aspects 9 through 17.

Aspect 23: A non-transitory computer-readable medium storing code for wireless communications, the code comprising instructions executable by one or more processors to perform a method of any of aspects 9 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein. Components within a wireless communication system may be coupled (for example, operatively, communicatively, functionally, electronically, and/or electrically) to each other.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive a first downlink message that updates one or more timers associated with triggering a connected mode discontinuous reception at the UE;

transmit a first uplink message prior to an expiration of the one or more timers associated with triggering the connected mode discontinuous reception, the first uplink message including an indication of whether the UE expects to restart the one or more timers or to enter the connected mode discontinuous reception following transmission of the first uplink message; and selectively enter the connected mode discontinuous reception or remain in an awake state following transmission of the first uplink message based at least in part on a status of the one or more timers associated with triggering the connected mode discontinuous reception at the UE and the indication of the first uplink message.

2. The UE of claim 1, wherein the one or more processors are individually or collectively further operable to execute the code to cause the UE to:

transmit, prior to transmitting the first uplink message, a second uplink message indicating a capability of the UE to transmit the first uplink message including the indication of whether the UE expects to restart the one or more timers.

3. The UE of claim 2, wherein the one or more processors are individually or collectively further operable to execute the code to cause the UE to:

receive a second downlink message indicating a configuration for the UE to transmit the first uplink message including the indication of whether the UE expects to restart the one or more timers based at least in part on the capability of the UE.

4. The UE of claim 1, wherein the one or more processors are individually or collectively further operable to execute the code to cause the UE to:

receive a second downlink message enabling the UE to transmit the first uplink message including the indication of whether the UE expects to restart the one or more timers.

5. The UE of claim 1, wherein the one or more processors are individually or collectively further operable to execute the code to cause the UE to:

receive, prior to the expiration of the one or more timers associated with triggering the connected mode discontinuous reception, a third downlink message including an indication of whether a network entity expects to start a discontinuous reception downlink retransmission timer following transmission of the third downlink message.

6. The UE of claim 5, wherein the third downlink message comprises a physical downlink shared channel (PDSCH) transmission including a medium access control (MAC) control element (MAC-CE), the MAC-CE including the indication of whether the network entity expects to start the discontinuous reception downlink retransmission timer following transmission of the third downlink message.

7. The UE of claim 1, wherein the indication of whether the UE expects to restart the one or more timers is based at least in part on one or more of: a power level associated with the UE, an expectation of one or more downlink messages from a network entity, or an expectation of one or more uplink message by the UE.

8. The UE of claim 1, wherein the first uplink message is a last uplink transmission by the UE prior to the expiration of the one or more timers.

9. A network entity, comprising:

one or more memories storing processor-executable code; and one or more processors coupled with the one or more memories and individually or collectively operable to execute the code to cause the network entity to:

output a first downlink message that updates one or more timers associated with triggering a connected mode discontinuous reception for uplink messages from a user equipment (UE); and obtain a first uplink message prior to an expiration of the one or more timers associated with triggering the connected mode discontinuous reception, the first uplink message including an indication of whether the UE expects to restart the one or more timers or to enter the connected mode discontinuous reception following reception of the first downlink message at the UE.

10. The network entity of claim 9, wherein the one or more processors are individually or collectively further operable to execute the code to cause the network entity to:

output a second downlink message based at least in part on the indication of the UE expecting to restart the one or more timers.

11. The network entity of claim 9, wherein the one or more processors are individually or collectively further operable to execute the code to cause the network entity to:

obtain, prior to receiving the first uplink message, a second uplink message indicating a capability of the UE to transmit the first uplink message including the indication of whether the UE expects to restart the one or more timers.

12. The network entity of claim 11, wherein the one or more processors are individually or collectively further operable to execute the code to cause the network entity to:

output a second downlink message indicating a configuration for the UE to transmit the first uplink message including the indication of whether the UE expects restart the one or more timers based at least in part on the capability of the UE.

13. The network entity of claim 9, wherein the one or more processors are individually or collectively further operable to execute the code to cause the network entity to:

output a second downlink message enabling the UE to transmit the first uplink message including the indication of whether the UE expects to restart the one or more timers.

14. The network entity of claim 9, wherein the one or more processors are individually or collectively further operable to execute the code to cause the network entity to:

output, prior to the expiration of the one or more timers associated with triggering the connected mode discontinuous reception, a third downlink message including an indication of whether the network entity expects to start a discontinuous reception downlink retransmission timer following transmission of the third downlink message.

15. The network entity of claim 14, wherein the third downlink message comprises a physical downlink shared channel (PDSCH) transmission including a medium access control (MAC) control element (MAC-CE), the MAC-CE including the indication of whether the network entity expects to start the discontinuous reception downlink retransmission timer following transmission of the third downlink message.

16. The network entity of claim 9, wherein the indication of whether the UE expects to restart the one or more timers is based at least in part on one or more of: a power level associated with the UE, an expectation of one or more downlink messages from a network entity, or an expectation of one or more uplink message by the UE.

17. The network entity of claim 9, wherein the first uplink message is a last uplink transmission by the UE prior to the expiration of the one or more timers.

18. A method for wireless communications at a user equipment (UE), comprising:

receiving a first downlink message that updates one or more timers associated with triggering a connected mode discontinuous reception at the UE;

transmitting a first uplink message prior to an expiration of the one or more timers associated with triggering the connected mode discontinuous reception, the first uplink message including an indication of whether the UE expects to restart the one or more timers or to enter the connected mode discontinuous reception following transmission of the first uplink message; and selectively entering the connected mode discontinuous reception or remaining in an awake state following transmission of the first uplink message based at least in part on a status of the one or more timers associated with triggering the connected mode discontinuous reception at the UE and the indication of the first uplink message.

19. The method of claim 18, further comprising:

transmitting, prior to transmitting the first uplink message, a second uplink message indicating a capability of the UE to transmit the first uplink message including the indication of whether the UE expects to restart the one or more timers.

20. The method of claim 19, further comprising:

receiving a second downlink message indicating a configuration for the UE to transmit the first uplink message including the indication of whether the UE expects to restart the one or more timers based at least in part on the capability of the UE.

* * * * *